United States Patent
Czyzewski et al.

(10) Patent No.: US 9,940,776 B2
(45) Date of Patent: *Apr. 10, 2018

(54) BET SENSING APPARATUSES AND RELATED DEVICES AND METHODS

(71) Applicant: Bally Gaming, Inc., Las Vegas, NV (US)

(72) Inventors: Zbigniew Czyzewski, Henderson, NV (US); Nathan J. Wadds, Waverley (AU); David Bajorins, Bothell, WA (US); Daniel Fox, Duvall, WA (US); Maciej Jakuc, Everett, WA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,652

(22) Filed: Oct. 24, 2016

(65) Prior Publication Data

US 2017/0039799 A1   Feb. 9, 2017

Related U.S. Application Data

(63) Continuation of application No. 14/500,687, filed on Sep. 29, 2014, now Pat. No. 9,478,099, which is a
(Continued)

(51) Int. Cl.
*A63F 9/24* (2006.01)
*A63F 13/00* (2014.01)
(Continued)

(52) U.S. Cl.
CPC ........ *G07F 17/322* (2013.01); *G07F 17/3204* (2013.01); *G07F 17/3225* (2013.01); *G07F 17/3248* (2013.01); *G07F 17/3288* (2013.01)

(58) Field of Classification Search
CPC ............... G07F 17/322; G07F 17/3204; G07F 17/3288; G07F 17/3248
See application file for complete search history.

(56) References Cited

U.S. PATENT DOCUMENTS 755,983 A   3/1904 Wood
2,891,437 A   6/1959 Tripp
(Continued)

FOREIGN PATENT DOCUMENTS

CN   1182483 A   5/1998
CN   1692379 A   11/2005
(Continued)

OTHER PUBLICATIONS

PCT International Search Report and Written Opinion of the International Application No. PCT/US2015/047233, dated Dec. 17, 2015, 10 pages.
(Continued)

*Primary Examiner* — Kevin Y Kim
(74) *Attorney, Agent, or Firm* — TraskBritt

(57) ABSTRACT

A bet sensor for sensing values of gaming tokens may include a bet placement surface configured and oriented to support a stack of gaming tokens thereon and an image sensor located and oriented to capture an image of a lateral side surface of at least one gaming token located on the bet placement surface. The image may depict the lateral side surface in a radial format. The bet sensor may include a processor in communication with the image sensor. The processor is configured to acquire image data from the image and analyze the image data to determine a wager value of the at least one gaming token. A gaming table may include such a bet sensor. The disclosure includes methods of operating such a gaming table.

20 Claims, 22 Drawing Sheets

Related U.S. Application Data continuation-in-part of application No. 13/829,843, filed on Mar. 14, 2013, now Pat. No. 8,961,298.

(60) Provisional application No. 61/751,780, filed on Jan. 11, 2013.

(51) Int. Cl.
| | | |
|---|---|---|
| G06F 17/00 | (2006.01) | |
| G06F 19/00 | (2011.01) | |
| G07F 17/32 | (2006.01) | |

(56) References Cited

U.S. PATENT DOCUMENTS

| | | |
|---|---|---|
| 3,819,186 A | 6/1974 | Hinterstocker |
| 3,950,712 A | 4/1976 | Chenausky et al. |
| 4,531,187 A | 7/1985 | Uhland et al. |
| 4,586,712 A | 5/1986 | Lorber et al. |
| 4,814,589 A | 3/1989 | Storch et al. |
| 4,838,557 A | 6/1989 | Floyhar et al. |
| 4,861,041 A | 8/1989 | Jones et al. |
| 4,969,037 A | 11/1990 | Poleschinski et al. |
| 4,969,648 A | 11/1990 | Hollinger et al. |
| 5,275,411 A | 1/1994 | Breeding |
| 5,377,994 A | 1/1995 | Jones et al. |
| 5,393,067 A | 2/1995 | Paulsen et al. |
| 5,536,016 A | 7/1996 | Thompson |
| 5,573,249 A | 11/1996 | Johnson et al. |
| 5,586,936 A | 12/1996 | Bennett et al. |
| 5,605,334 A | 2/1997 | McCrea et al. |
| 5,695,189 A | 12/1997 | Breeding et al. |
| 5,707,287 A | 1/1998 | McCrea et al. |
| 5,735,525 A | 4/1998 | McCrea et al. |
| 5,749,008 A | 5/1998 | Ishihara et al. |
| 5,770,533 A | 6/1998 | Franchi et al. |
| 5,781,647 A | 7/1998 | Fishbine et al. |
| 5,794,935 A | 8/1998 | Lo |
| 5,809,482 A | 9/1998 | Strisower |
| 5,823,875 A | 10/1998 | Tarantino et al. |
| 5,836,818 A | 11/1998 | Jones et al. |
| 5,909,876 A | 6/1999 | Brown et al. |
| 5,911,626 A | 6/1999 | McCrea et al. |
| 5,924,926 A | 7/1999 | Brown et al. |
| 5,941,769 A | 8/1999 | Order |
| 6,093,103 A | 7/2000 | McCrea et al. |
| 6,117,012 A | 9/2000 | McCrea et al. |
| 6,254,484 B1 | 7/2001 | McCrea, Jr. |
| 6,299,534 B1 | 10/2001 | Breeding et al. |
| 6,313,871 B1 | 11/2001 | Schubert |
| 6,346,044 B1 | 2/2002 | McCrea, Jr. |
| 6,431,984 B2 | 8/2002 | Coyer et al. |
| 6,454,437 B1 | 9/2002 | Kelly |
| 6,460,848 B1 | 10/2002 | Soltys et al. |
| 6,514,140 B1 | 2/2003 | Storch |
| 6,517,436 B2 | 2/2003 | Soltys et al. |
| 6,520,857 B2 | 2/2003 | Soltys et al. |
| 6,530,836 B2 | 3/2003 | Soltys et al. |
| 6,532,297 B1 | 3/2003 | Lindquist |
| 6,568,682 B1 | 5/2003 | Hogan et al. |
| 6,579,180 B2 | 6/2003 | Soltys et al. |
| 6,579,181 B2 | 6/2003 | Soltys et al. |
| 6,629,889 B2 | 10/2003 | Mothwurf |
| 6,652,379 B2 | 11/2003 | Soltys et al. |
| 6,663,490 B2 | 12/2003 | Soltys et al. |
| 6,688,979 B2 | 2/2004 | Soltys et al. |
| 6,712,696 B2 | 3/2004 | Soltys et al. |
| 6,744,569 B2 | 6/2004 | Geng |
| 6,901,163 B1 | 5/2005 | Pearce et al. |
| 6,954,911 B2 | 10/2005 | Pierrat |
| 7,124,947 B2 | 10/2006 | Storch |
| 7,316,615 B2 | 1/2008 | Soltys et al. |
| 7,351,145 B1 | 4/2008 | Ornstein et al. |
| 7,367,884 B2 | 5/2008 | Breeding et al. |
| 7,404,765 B2 | 7/2008 | Soltys et al. |
| 7,491,125 B2 | 2/2009 | Mathis et al. |
| 7,536,817 B2 | 5/2009 | Storch |
| 7,559,839 B2 | 7/2009 | Bahar |
| 7,570,781 B2 | 8/2009 | Rhoads et al. |
| 7,753,781 B2 | 7/2010 | Storch |
| 7,901,285 B2 | 3/2011 | Tran et al. |
| 8,027,508 B2 | 9/2011 | Rhoads et al. |
| 8,285,034 B2 | 10/2012 | Rajaraman et al. |
| 8,451,318 B2 | 5/2013 | Trubko et al. |
| 8,606,002 B2 | 12/2013 | Rajaraman et al. |
| 8,774,463 B2 | 7/2014 | Boncyk et al. |
| 2002/0042299 A1 | 4/2002 | Soltys et al. |
| 2003/0022614 A1 | 1/2003 | Momemy |
| 2003/0087694 A1 | 5/2003 | Storch |
| 2003/0220136 A1 | 11/2003 | Soltys et al. |
| 2004/0005920 A1 | 1/2004 | Soltys et al. |
| 2005/0026680 A1 | 2/2005 | Gururajan |
| 2005/0137005 A1 | 6/2005 | Soltys et al. |
| 2006/0132747 A1 | 6/2006 | Singer et al. |
| 2006/0160600 A1 | 7/2006 | Hill et al. |
| 2006/0160608 A1 | 7/2006 | Hill et al. |
| 2006/0177109 A1 | 8/2006 | Storch |
| 2006/0252521 A1 | 11/2006 | Gururajan et al. |
| 2007/0184898 A1 | 8/2007 | Miller et al. |
| 2009/0017888 A1 | 1/2009 | Kuhn et al. |
| 2009/0075723 A1 | 3/2009 | Richard et al. |
| 2009/0093293 A1 | 4/2009 | Koyama et al. |
| 2009/0191933 A1 | 7/2009 | French |
| 2011/0052049 A1 | 3/2011 | Rajaraman et al. |
| 2012/0089252 A1 | 4/2012 | Kwirandt |
| 2012/0122559 A1 | 5/2012 | Kelly et al. |
| 2014/0200071 A1 | 7/2014 | Czyzewski et al. |

FOREIGN PATENT DOCUMENTS

| | | |
|---|---|---|
| CN | 1993704 A | 7/2007 |
| JP | 06142965 A | 5/1994 |
| KR | 2006122390 A | 11/2006 |
| WO | 2005104049 A1 | 11/2006 |

OTHER PUBLICATIONS

Otsu Nobuyuki, "A threshold selection method from gray-level histograms", IEEE Trans. Sys., Man., Cyber. 9 (1) (1979) pp. 62-66.

Xu et al., "Image Segmentation Using Deformable Models", Handbook of Medical Imaging—vol. 2: Medical Image Processing and Analysis, edited by J.M. Fitzpatrick and M. Sonka, SPIE Press (May 2000) pp. 129-174.

The OpenCV Reference Manual, Release 2.4.9.0, http://ecee.colorado.edu/~siewerts/extra/ecen5763/ecen5763_doc/opencv2refman.pdf, (Apr. 2014), pp. 337-338.

Jain et al., "Coin Recognition Using Circular Hough Transform", May 2012, International Journal of Electronics Communication and Computer Technology (IJECCT), vol. 2 Issue 3, pp. 101-104.

BET SENSING APPARATUSES AND RELATED DEVICES AND METHODS

CROSS-REFERENCE TO RELATED APPLICATIONS

This application is a continuation of U.S. patent application Ser. No. 14/500,687, filed Sep. 29, 2014, now U.S. Pat. No. 9,478,099, issued Oct. 25, 2016, which is a continuation-in-part of U.S. patent application Ser. No. 13/829,843, filed Mar. 14, 2013, now U.S. Pat. No. 8,961,298, issued Feb. 24, 2015, which claims the benefit of U.S. Provisional Patent Application Ser. No. 61/751,780, filed Jan. 11, 2013, the disclosure of each of which is hereby incorporated herein in its entirety by this reference.

TECHNICAL FIELD

The present disclosure, in various embodiments, relates to bet sensors for use in gaming applications, to gaming tables incorporating bet sensors, and to methods of operating such bet sensors.

BACKGROUND

In casinos and other gaming institutions, betting tables often seat up to seven players and a table operator, or dealer. Each player makes their wager by placing casino tokens on a designated location on the table. Casino tokens, also referred to as "chips," "checks," or "cheques," are small disks used by a player in lieu of currency. The tokens are interchangeable with money at the specific casino or gaming institution in which the tokens are used. It is common for casinos or other gaming institutions to provide unique tokens, each identifiable by particular colors and markings on the face and lateral side edges thereof to represent specific monetary values. The dealer is often responsible for determining the wager value of a stack of gaming tokens placed by a player.

BRIEF SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

In some embodiments, the present disclosure includes a bet sensor for sensing values of multiple gaming tokens. The bet sensor includes a bet placement surface configured and oriented to support a stack of gaming tokens thereon and an image sensor is located and oriented to capture an image of a lateral side surface of at least one gaming token located on the bet placement surface. The image depicts the lateral side surface in a radial format. The bet sensor includes a processor in communication with the image sensor. The processor is configured to acquire image data from the image and analyze the image data to determine a wager value of the at least one token.

In other embodiments, the present disclosure includes a gaming table including at least one bet sensor located proximate a surface of the gaming table. The at least one bet sensor includes a bet placement surface configured and oriented to support a stack of gaming tokens thereon and an image sensor located and oriented to capture an image of a lateral side surface of at least one gaming token located on the bet placement surface. The image depicts the lateral side surface in a radial format. In other words, each token is represented as a ring with an outer circle defining a first edge and an inner circle defining a second edge. The at least one bet sensor includes a processor in communication with the image sensor, the processor configured to acquire image data from the image and interpret the image data to determine a wager value of the at least one gaming token.

In yet other embodiments, the present disclosure includes a method of operating a gaming table having at least one bet placement surface thereon for supporting a stack of gaming tokens at a location. The method includes capturing, with an image sensor, an image of a lateral side surface of at least one gaming token at the location, wherein the lateral side surface is depicted in a radial format and converting the image, with a processor, into a converted image depicting the lateral side surface of the at least one gaming token in a form of a linear layer. The method also includes acquiring image data from the linear format of the converted image with the processor and analyzing the image data to determine a wager value of the at least one token.

DETAILED DESCRIPTION

The illustrations presented herein are not meant to be actual views of any particular bet sensor, gaming table, or component thereof, but are merely idealized representations that are used to describe embodiments of the disclosure.

The efficiency of a gaming table may be increased by providing a means to measure wagers of varying amounts, while reducing the amount of time required to determine the value of wagers placed during betting games played at the table. The faster wager values are calculated, the faster games may be conducted, resulting in an increase in the amount of games played at the table and, correspondingly, the amount of money wagered. Bet sensors of the present invention may be used to register wagers made on the occurrence of certain events, such as bonus events that pay large jackpots. In one example, the bet sensor can be used to register a wager on one or more progressive jackpot events that may include additional fixed payouts and or odds payout amounts. For example, a game might pay 500:1 for a Royal Flush, and the amount on the meter for the same hand. The game rules may require the first $1.00 to fund the meter, and the rest of the wager to be made against the odds payout amounts. If, for example, the meter had 15K on it when a player makes a $5.00 variable bet wager, and the player obtains a Royal Flush, the player wins the 15K on the meter, plus 500:1 on the other $4.00 of the bet, or $2,000. It is desirable for security reasons to provide a bet sensor that can register the bets automatically in order to assure that large jackpots are paid in the correct amounts to the players. Human table operators or dealers have limits on the speed with which they can manually determine the value of each wager placed during a betting game while also managing other aspects of the game. Bet sensors are disclosed herein that may be used to quickly determine the value of a wager placed in gaming tokens and, in some embodiments, to display the wager value to a player and/or a dealer. The bet sensor may include a mirror arrangement in proximity to a betting surface on which a stack of gaming tokens may be placed by a player. The mirror arrangement may direct a two-dimensional image of the entire circumference of the three-dimensional lateral side surface of the stack of gaming tokens onto an image sensor. A processor in communication with the image sensor may be configured under control of a computer program to perform one or more algorithms using the image to determine the value of each token in the stack of gaming tokens and to determine the sum value of the stack of gaming tokens.

Figure 1:
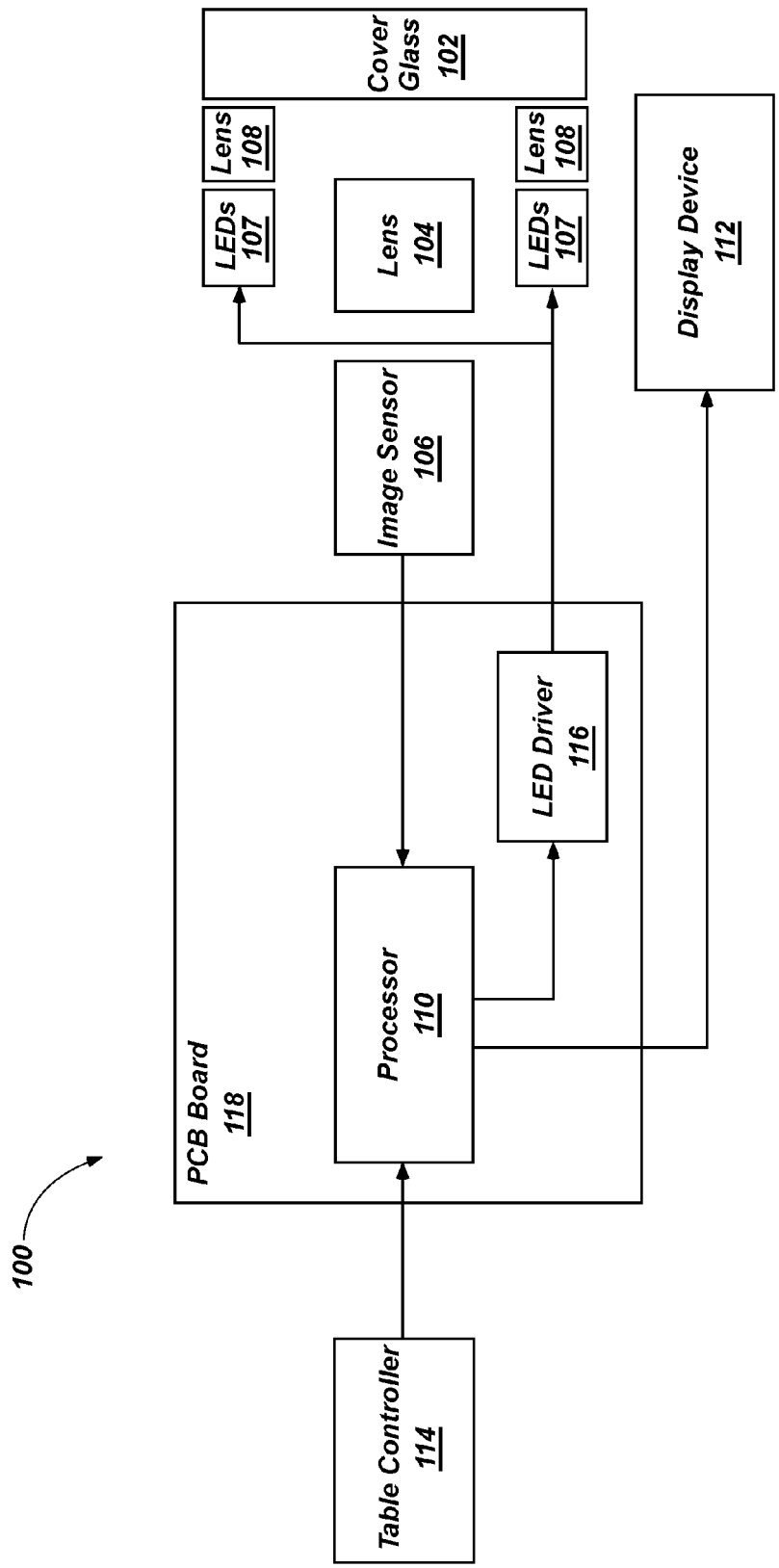
FIG. 1 is a simplified schematic diagram illustrating an embodiment of a bet sensor of the present disclosure.

FIG. 1 illustrates a simplified schematic diagram of a bet sensor 100 according to an embodiment of the present disclosure. The bet sensor 100 may include a transparent cover 102 in visual register with an optional lens 104. The transparent cover 102 may be embedded in, or otherwise disposed proximate a gaming table (not shown in FIG. 1) and may have a bet placement surface thereon that is configured to support a stack of gaming tokens thereon. In other embodiments, the cover may be semi-transparent and may also serve as a video display, which is described in more detail below. An image sensor 106 may be positioned to view the stack of gaming tokens through the transparent cover 102 and the optional lens 104. An optional light source may be located proximate the transparent cover 102. The light source may comprise one or more light-emitting diodes (LEDs) 107, wherein the LEDs 107 are configured for illuminating the stack of gaming tokens to provide a satisfactory image of the stack of gaming tokens to be acquired by the image sensor 106. One or more lenses 108 may be employed with the LEDs 107 to provide desired light emission qualities. It is to be appreciated, however, that the bet sensor 100 may be configured without the optional light source, wherein an image of the stack of gaming tokens illuminated by ambient light may be transmitted to the image sensor 106. A processor 110 may be in electronic communication with the image sensor 106 and may be configured under control of a computer program to calculate the value of the stack of gaming tokens placed as a wager on the transparent cover 102 by performing one or more algorithms using the image of the stack of gaming tokens acquired using the image sensor 106.

The processor 110 may also be in electronic communication with a display device 112 configured to display the value of the wager to the payer who placed the wager, to other players, to a table operator, or to any combination thereof. The display device 112 may be part of the bet sensing system 100 in one embodiment and may be external to the sensing system 100 in another embodiment. The processor 110 may additionally be in electronic communication with a table controller 114 that is configured for use by the table operator. An LED driver 116 may be controlled by the processor 110, and may comprise a circuit configured to control operational aspects of the LEDs 107, including, by way of non-limiting example, on/off function, luminous intensity, color effects, fading, and pulse or strobe effects. In this manner, the processor 110 may control the LEDs 107 for purposes of illuminating the stack of gaming tokens, for conveying visible lighting effects or signals to players, or both. The processor 100 and at least the LED driver 116 may be located on a printed circuit board (PCB) 118, wherein electronic communication between the processor 110 and the LED driver 116 may be provided through traces, vias, interconnects, or any combination thereof, in and/or on the PCB 118.

Figure 2:
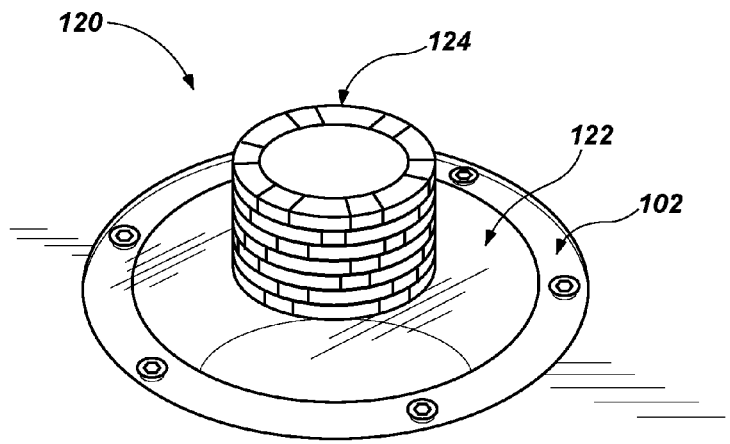
FIG. 2 illustrates a perspective view of a stack of gaming chips disposed on components of an embodiment of a bet sensor of the present disclosure.

FIG. 2 illustrates a stack of gaming tokens supported on an illumination unit 120 of the bet sensor 100 schematically illustrated in FIG. 1. The illumination unit 120 is used for supporting and illuminating a stack of gaming tokens on the bet sensor 100. As shown in FIG. 2, the illumination unit 120 may include the transparent or semi-transparent cover 102, which has an upper bet placement surface 122 thereon. The bet placement surface 122 may be configured and oriented to support a stack of gaming tokens 124 thereon. The transparent cover 102 may comprise any material that is sufficiently transparent to allow an image of the stack of gaming tokens to be acquired from an opposing side of the transparent cover 102 from the upper bet placement surface 122. For example, the transparent cover 102 may comprise a ceramic material (e.g., a glass) or a polymer material (e.g., plastic, epoxy, etc.). In some embodiments, the transparent cover 102 may be tinted to reduce visibility of components of the bet sensor 100 located beneath the transparent cover 102 by players. In other embodiments, the transparent cover 102 may be replaced by a transparent or semi-transparent display such as an Active Matrix Organic Light-Emitting Diode (AMOLED). Thus, as used herein, the term "transparent" does not indicate or require transmissivity of all wavelengths of light, but only of those required for operation of the bet sensor 100. For example, the transparent cover 102 may be configured to allow transmissivity of only certain wavelengths of light. In yet other embodiments, the transparent cover 102 may be configured to allow transmissivity of all wavelengths of visible light. In further embodiments, the transparent cover 102 may be fifty percent (50%) transparent, sixty percent (60%) transparent, seventy percent (70%) transparent, eighty percent (80%) transparent, ninety percent (90%) transparent, one hundred percent (100%) transparent, or any other degree of semi-transparency in regards to wavelengths of light required for operation of the bet sensor. The transparent cover 102 may have any suitable thickness. As a non-limiting example, the transparent cover 102 may have a thickness less than or equal to about 1.6 mm. In other embodiments, the transparent cover 102 may have a thickness between about 1.6 mm and 3.2 mm. In yet other embodiments, the transparent cover 102 may have a thickness greater than about 3.2 mm. The transparent cover 102 may be circular in shape, as shown in FIG. 2, although other shapes may be utilized, including, by way of non-limiting example, square, rectangular, triangular, elliptical, annular, or any other shape. In embodiments where a circular transparent cover 102 is used, the diameter of the transparent cover 102 may be about 76.2 mm, although a smaller or larger diameter is within the scope of the embodiments disclosed herein. As discussed previously, the transparent cover 102 may be embedded in a gaming table, wherein the bet placement surface 122 is substantially flush with the top surface of the gaming table. In other embodiments, the transparent cover 102 may be located such that the bet placement surface 122 is positioned above or below the top surface of the gaming table. In yet other embodiments, the transparent cover 102 may be located separate from the gaming table. Moreover, it is to be appreciated that the bet sensor 100 may also be utilized in gaming applications without a gaming table.

Figure 3:
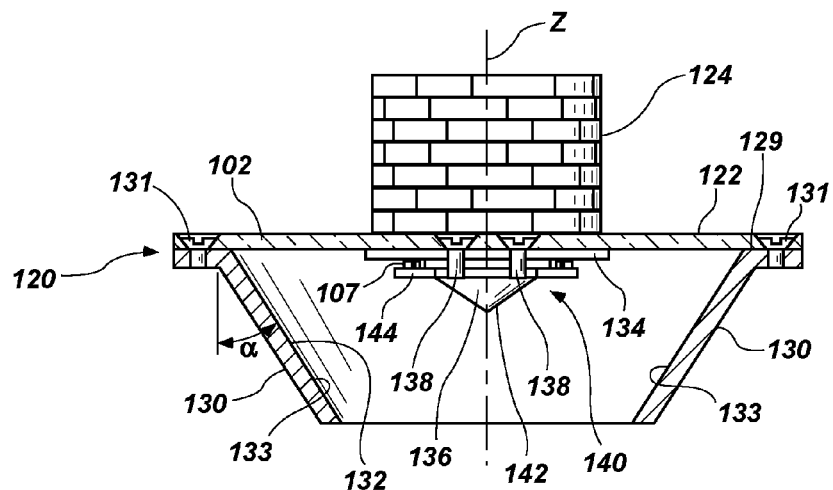
FIG. 3 illustrates a side, partial cross-sectional view of the stack of gaming chips and components of the bet sensor shown in FIGS. 1 and 2.

FIG. 3 is a side, partial cross-sectional view of the illumination unit 120 of FIG. 2 and illustrates a stack of gaming tokens supported on the bet placement surface 122 of the transparent cover 102. As shown, the transparent cover 102 may be joined to a top, planar surface 129 of a first reflective structure 130. The transparent cover 102 and the first reflective structure 130 may be joined by screws 131, as shown, or by alternative means, such as, by way of non-limiting example, bolts, clasps, adhesives, corresponding male and female mating components, threaded connections, other mechanical fasteners, etc. The first reflective structure 130 may comprise a frustoconical mirror having an inward-facing reflective surface 133. The inward-facing reflective surface 133 may comprise a thin, flexible reflective film, such as a commercially available folding mirror, affixed to an inner surface of the first reflective structure 130. Alternatively, the inward-facing reflective surface 133 may comprise a layer of reflective metal or metal alloy, such as silver, chrome, aluminum, etc., deposited on the inner surface of the first reflective structure 130. The layer may be polished or machined in some embodiments. In yet other embodiments, the inward-facing reflective surface 133 may comprise a reflective polymeric material deposited or otherwise provided on the inner surface of the first reflective structure 130. In still yet other embodiments, the first reflective structure 130 may be formed from a reflective metal, metal alloy, or polymeric material and the inner surface thereof may be polished to a desired level of reflectivity, or otherwise treated, to form the inward-facing reflective surface 133. It is to be appreciated that other types of reflective materials may be utilized to provide the inward-facing reflective surface 133. The inward-facing reflective surface 133 may be machined using a diamond turning process to a surface finish having an optical surface quality of about 60-40 scratch-dig and a surface accuracy of 1λ (λ=633.2 nanometers (nm)).

Figure 4:
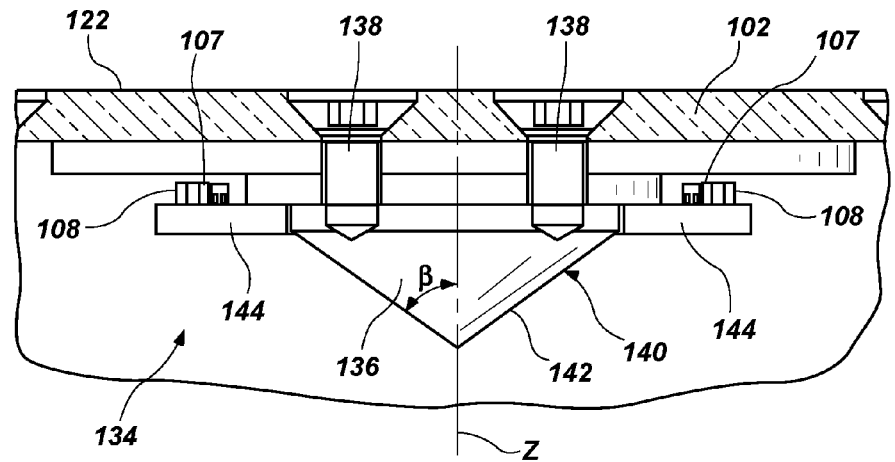
FIG. 4 is an enlarged view of components of the bet sensor of FIGS. 1 through 3.

A hub structure 134 carrying a second reflective structure 136 may be centrally affixed to an underside of the transparent cover 102 by screws 138, as also depicted in FIG. 4. The hub structure 134 may alternatively be affixed to the transparent cover 102 by bolts, clasps, adhesives, corresponding male and female mating components, threaded connections, other mechanical fasteners, or any other means of attachment. In yet other alternative embodiments (not shown), the transparent cover 102, the first reflective structure 130, and the hub structure 134 may each be removably snap-fit together to provide simple assembly and disassembly of the illumination unit 120. In still yet other embodiments, the transparent cover 102, the first reflective structure 130, and the hub structure 134 may be formed as a single, unitary structure in a process such as, by way of non-limiting example, injection molding or machining. Referring again to FIGS. 3 and 4, the second reflective structure 136 carried by the hub structure 134 may comprise a generally conical-shaped mirror 140 having an outward-facing (depicted in FIG. 3 as downward-facing) reflective surface 142. The conical mirror 140 may be concentrically and coaxially aligned with the frustoconical mirror 132 about central axis Z. The outward-facing reflective surface 142 of the second reflective structure 136 may comprise any of the materials previously described in relation to the inward-facing reflective surface 133 of the first reflective structure 130.

With continued reference to FIGS. 3 and 4, one or more printed circuit boards (PCBs) 144, each carrying one or more light sources in the form of, for example, LEDs 107 thereon, may be affixed to the hub structure 134. Each of the LEDs 107 may be configured as previously described with reference to FIG. 1. Each LED 107 may be oriented to emit light generally radially outward from the hub structure 134 toward the inward-facing reflective surface 133 of the frustoconical mirror 132. Each of the LEDs 107 may be located substantially on a common laterally-extending plane orthogonal to axis Z. The inward-facing reflective surface 133 may have an angle of inclination α relative to axis Z (FIG. 3), and the outward-facing reflective surface 142 may have an angle of inclination β relative to axis Z (FIG. 4). The angle of inclination α of the inward-facing reflective surface 133 is selected to cause light rays emitted from the LEDs 107 to reflect from the inward-facing reflective surface 133 toward and through the transparent cover 102 and onto a lateral side surface 146 of the stack of gaming tokens 124, thus illuminating the stack of gaming tokens 124. The angle of inclination α of the inward-facing reflective surface 133 relative to the Z axis may be in the range of about 0 degrees to about 85 degrees. In other embodiments, the angle of inclination α of the inward-facing reflective surface 133 relative to the Z axis may be in the range of about 15 degrees to about 60 degrees. In yet other embodiments, the angle of inclination α of the inward-facing reflective surface 133 relative to the Z axis may be in the range of about 30 degrees to about 40 degrees. By way of non-limiting example, the angle of inclination α of the inward-facing reflective surface 133 relative to the Z axis may be about 32.48 degrees. The angle of inclination β of the outward-facing reflective surface 142 relative to the Z axis may be in the range of about 15 degrees to about 85 degrees. In other embodiments, the angle of inclination β of the outward-facing reflective surface 142 relative to the Z axis may be in the range of about 30 degrees to about 70 degrees. In yet other embodiments, the angle of inclination β of the outward-facing reflective surface 142 relative to the Z axis may be in the range of about 50 degrees to about 60 degrees. By way of non-limiting example, the angle of inclination β of the outward-facing reflective surface 142 relative to the Z axis may be about 54.64 degrees. Refraction of the light rays may occur as they pass through the transparent cover 102. Such refraction may be accounted for when selecting the angle of inclination α of the inward-facing reflective surface 133 to ensure that the lateral side surface of the stack of gaming tokens 124 is illuminated by the light rays after they have reflected from the inward-facing reflective surface 133 and passed through the transparent cover 102. While FIGS. 3 and 4 illustrate each LED 107 being mounted on a separate PCB, alternatively, all of the LEDs 107 may be mounted to a single PCB 144 attached to the hub structure 134. It is to be appreciated that in yet other embodiments, a plurality of PCBs 144 may be attached to the hub structure 134, wherein each of the plurality of PCBs 144 carries two or more LEDs 107.

Figure 5:
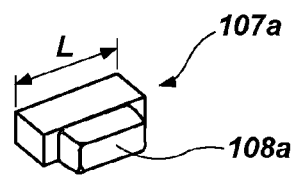
FIG. 5 illustrates a perspective view of a light-emitting diode (LED) that may be used in a bet sensor as illustrated in FIGS. 1 through 4.
Figure 6:
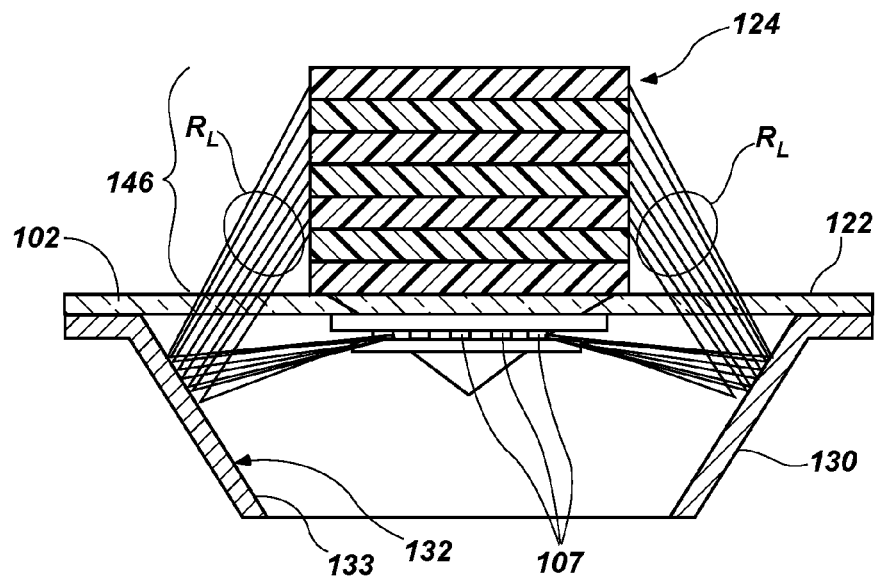
FIG. 6 illustrates a side, cross-sectional view of components of the bet sensor shown in FIGS. 1 through 4 and illustrates illumination light rays being directed onto a stack of gaming tokens on the bet sensor.

As shown in greater detail in FIGS. 4 and 5, each LED 107 may comprise a lens 108 or other optical component configured to provide desired light emission characteristics. The LEDs 107 may be selected based on performance characteristics, such as size, luminous intensity, emittable color spectrum, and pulse or strobe capabilities. Various LEDs suitable for use are commercially available. As a non-limiting example, the LED sold as model number LW V283 by Osram Ag. of Munich, Germany, may be used as a light source (e.g., the LEDs 107) in embodiments of bet sensors of the present disclosure, such as the bet sensor 100. The LEDs 107 may be relatively small. For example, FIG. 5 illustrates an LED 107a that may be used with the illumination unit 120. The LED 107a measures about 1.9 mm at its largest dimension, L, and includes a lens 108a for disbursing the light rays emitted by the LED 107a. As will be described in more detail below, the LEDs 107 may be controlled by the processor 110 (FIG. 1).

While FIGS. 3 and 4 illustrate two (2) LEDs 107 mounted to the hub structure 134 on opposing sides thereof, it is to be appreciated that any number of LEDs 107 may be mounted to the hub structure 134 and oriented to emit light onto the inward-facing reflective surface 133 of the frustoconical mirror 132 to be subsequently reflected through the transparent cover 102 and onto the lateral side surface 146 of the stack of gaming tokens 124. For example, the illumination unit 120 may comprise three (3) LEDs 107 symmetrically mounted about the central axis Z along a circumference of the hub structure 134 and separated by intervals of about 120 degrees. In other embodiments, the illumination unit 120 may comprise four (4) LEDs 107 symmetrically mounted about the central axis Z along a circumference of the hub structure 134 and separated by intervals of about 90 degrees. In yet other embodiments, the illumination unit 120 may comprise five (5) or more (e.g., twelve (12)) LEDs 107, which may be symmetrically mounted around the central axis Z along a circumference of the hub structure 134 and separated by substantially equal angular segments.

The number and orientation of the LEDs 107 mounted to the hub structure 134 may be tailored to optimize the illumination of the lateral side surface 146 of the stack of gaming tokens 124. The upper limit on the number of LEDs 107 attached to the hub structure 134 may be determined by the size of the LEDs 107, the size of the PCBs 144, the size of the hub structure 134, and the resulting number of LEDs 107 that may fit on the PCBs 144 attached to the hub structure 134. It is to be appreciated that the LEDs 107 are not required to be oriented symmetrically about a circumference of the hub structure 134, but may alternatively be located asymmetrically about a circumference of the hub structure 134. Furthermore, the LEDs 107 are not all required to be located on the same laterally-extending plane orthogonal to axis Z. In additional embodiments (not shown), the hub structure 134 may comprise two (2) or more rows of LEDs 107 mounted thereon and oriented to emit light onto the inward-facing reflective surface 133 of the frustoconical mirror 132. In yet further embodiments, the LEDs 107 may be attached to the hub structure 134 in a random arrangement and oriented to emit light onto the inward-facing reflective surface 133 of the frustoconical mirror 132.

It is to be appreciated that in alternative embodiments, as previously described, the bet sensor 100 may operate on ambient light only. For example, in such embodiments, the LEDs 107 and PCBs 144 may be omitted from the structures illustrated in FIGS. 3 through 7, and ambient light rays reflected off the lateral side surface of the stack of gaming tokens may be reflected from the mirror arrangement onto the image sensor 106.

Figure 7:
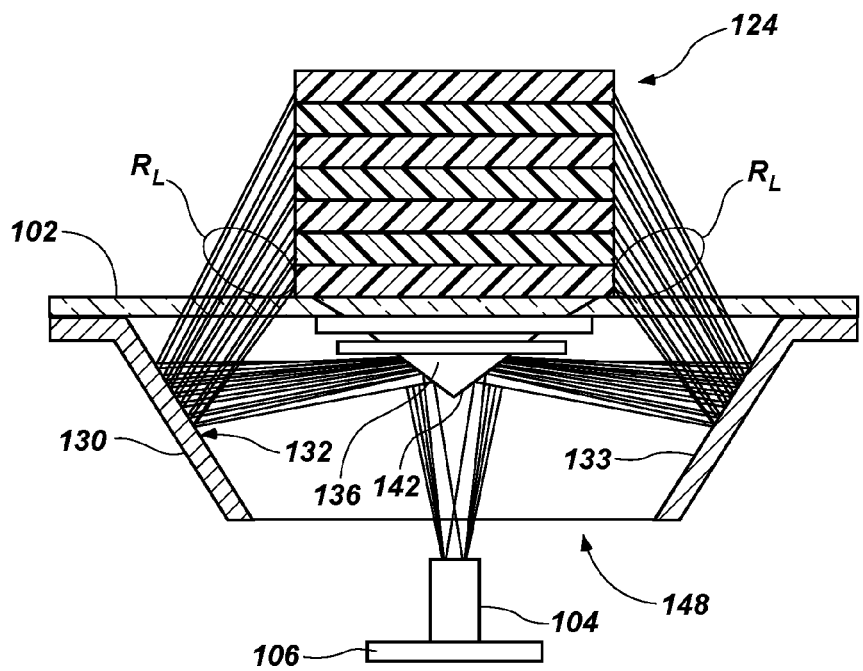
FIG. 7 illustrates a side, cross-sectional view of components of the bet sensor shown in FIGS. 1 through 4 and illustrates image light rays being directed onto an image sensor from a stack of gaming tokens on the bet sensor.

Referring now to FIG. 7, an image sensor 106 for acquiring images of the lateral side surface 146 of the stack of gaming tokens 124 is illustrated according to an embodiment of the present disclosure. The mirror arrangement, which includes the first reflective structure 130 and the second reflective structure 136, is located and configured to direct an image of at least substantially an entire circumference of a lateral side surface of a stack of gaming tokens 124 supported on the bet placement surface 122 of the transparent cover 102 onto the image sensor 106. In other words, the first reflective structure 130 and the second reflective structure 136 are sized and arranged relative to one another such that light rays $R_L$, including ambient light rays and/or illumination light rays emitted by the optional LEDs 107, are reflected off the lateral side surface 146 of the stack of gaming tokens 124 through the transparent cover 102 toward the inward-facing reflective surface 133 of the first reflective structure 130. The light rays are reflected from the inward-facing reflective surface 133 of the first reflective structure 130 toward the outward-facing reflective surface 142 of the second reflective structure 136, from which the light rays are reflected onto the image sensor 106.

Figure 8:
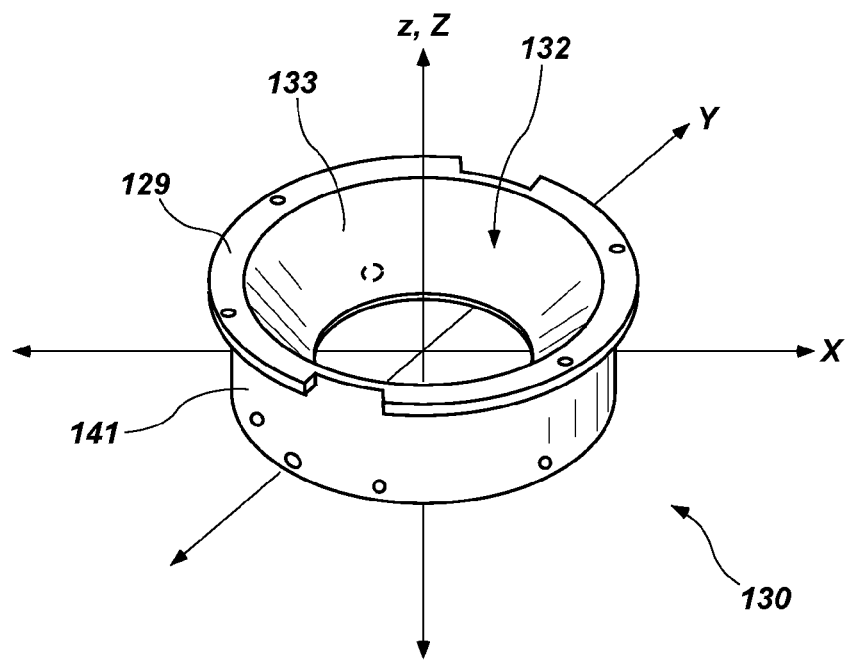
FIG. 8 illustrates a perspective view of a reflective structure having an inward-facing reflective surface that may be used in a bet sensor.

In the embodiments illustrated in FIGS. 3, 4, 6 and 7, the inward-facing reflective surface 133 of the first reflective structure 130 and the outward-facing reflective surface 142 of the second reflective structure 136 may each have a linear cross-sectional profile. In other embodiments, as illustrated in FIGS. 8 through 13, the inward- and outward-facing reflective surfaces 133, 142 may each have an arcuate cross-sectional profile. FIG. 8 illustrates a perspective view of the first reflective structure 130 according to such an embodiment. The first reflective structure 130 includes the inward-facing reflective surface 133 located radially inward of an outer, lateral side surface 141, both of which are concentric about longitudinal axis Z. The first reflective structure 130 also includes a top, planar surface 129 configured to abut the transparent cover 102.

Figure 9:
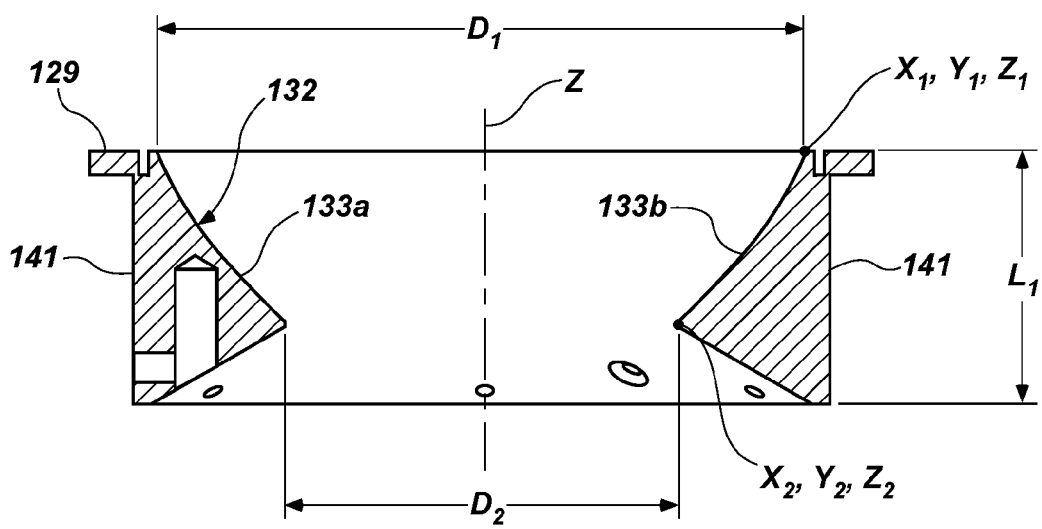
FIG. 9 illustrates a side, cross-sectional view of the reflective structure shown in FIG. 8.

FIG. 9 illustrates a side cross-sectional view of the first reflective structure 130 illustrated in FIG. 8 bisected by a plane containing the longitudinal axis Z of the first reflective structure 130. When the first reflective structure 130 is viewed in a side, cross-sectional view bisecting the first reflective structure 130 through the longitudinal axis Z, as shown in FIG. 9, the arcuate shape of directly opposing cross-sectional profiles 133a, 133b of the inward-facing reflective surface 133 may form a section of a prolate ellipse having its major axis coaxial with the longitudinal axis Z of the first reflective structure 130. In some such embodiments, the prolate ellipse formed by the directly opposing cross-sectional profiles 133a, 133b of the first reflective structure 130 may be defined by the parameters k and R, wherein k is the conic constant of the prolate ellipse and R, in a prolate ellipse, is the radius of the prolate ellipse at a point on the prolate ellipse coincident with the major axis of the prolate ellipse. It is to be appreciated that the conic constant k determines the shape of the prolate ellipse and R determines the relative size of the prolate ellipse. Moreover, the prolate ellipse defining the directly opposing cross-sectional profiles 133a, 133b of the inward-facing reflective surface 133 may be further defined by an equation $E_1$, expressed as $$Z = \frac{x^2 + y^2}{R + \sqrt{R^2 - (1+k)^2(x^2 + y^2)}},$$

wherein the parameters k and R are defined as previously described, and x, y, and z represent coordinates on a three-dimensional x, y, z Cartesian coordinate system, wherein the z axis is coaxial with the longitudinal axis Z of the first reflective structure 130 and orthogonal to the plane formed by the x and y axes. In three-dimensional space, such as shown in FIG. 8, the shape of the inward-facing reflective surface 133 may be defined as a prolate spheroid formed by rotating the previously described prolate ellipse through an angle of 360 degrees about its major axis. Using the x, y, z coordinate system described above, any reference point on the inward-facing reflective surface 133 may be defined in three-dimensional space by its x, y and z coordinate, wherein the x, y coordinates together define the lateral distance from axis z (and longitudinal axis Z) to the inward-facing reflective surface 133, and the z coordinate defines the axial distance from the center of the prolate spheroid to the reference point. It is to be appreciated that, using equation $E_1$, the exact shape of the inward-facing reflective surface 133 may be defined. For example, if k and R are established (setting the shape and size, respectively, of the prolate spheroid, as previously described), and the z coordinate (the axial distance from the center of the prolate ellipse to the z coordinate along axis z) is established, the lateral distance (x, y) from the z axis (coaxial with longitudinal axis Z) to the inward-facing reflective surface 133 at the z coordinate can be calculated using equation $E_1$. Alternatively, so long as k and R are established, and the lateral distance (x, y) from the longitudinal axis Z to the inward-facing reflective surface 133 is established, the z coordinate corresponding to such lateral distance can be calculated using equation $E_1$.

Accordingly, in embodiments where the shape of the inward-facing reflective surface 133 is a prolate spheroid in three-dimensional space, the size and shape of the inward-facing reflective surface 133 may be adjusted by altering the variables of equation $E_1$. FIG. 9 illustrates a non-limiting example of the inward-facing reflective surface 133 having a shape defined by a prolate spheroid, causing the shape of the cross-sectional profiles 133a, 133b of the inward-facing reflective surface 133 to be defined by a prolate ellipse. The prolate spheroid defining the shape of the inward-facing reflective surface 133 may have parameters of k=−0.5822 and R=25.6914 mm. The inward-facing reflective surface 133 may have a maximum diameter $D_1$ of about 62.1 mm at coordinate $(x_1, y_1, z_1)$, and may taper arcuately to a minimum diameter $D_2$ of about 41.7 mm at coordinate ($x_2$, $y_2$, $z_2$). The axial distance $L_1$, measured along axis Z, between the maximum diameter $D_1$ and the minimum diameter $D_2$, of the inward-facing reflective surface 133 may be about 15.0 mm. It is to be appreciated that the maximum and minimum diameters $D_1$, $D_2$ may be adjusted to be greater or less than 62.1 mm and 41.7 mm, respectively.

As previously described, if the shape and size of the prolate spheroid defining the inward-facing reflective surface 133 are established (by k and R, respectively), the z coordinate of the prolate spheroid can be determined along any portion of the inward-facing reflective surface 133 for which the diameter is known, such as, for example, at the maximum diameter $D_1$ at coordinate ($x_1$, $y_1$, $z_1$), at the minimum diameter $D_2$ at coordinate ($x_2$, $y_2$, $z_2$), or at any point therebetween, using equation $E_1$ (note that in the two-dimensional space of FIG. 9, one of the x and y coordinates would be the lateral distance between the longitudinal axis Z and the inward-facing reflective surface 133 and the other of the x and y coordinates would be zero).

Figure 10:
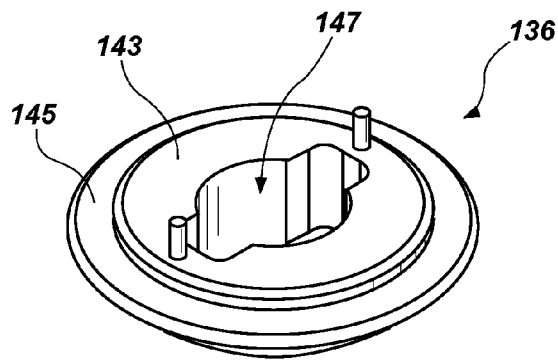
FIG. 10 illustrates a perspective view showing a top surface of a reflective structure that may be used in a bet sensor with the reflective structure shown in FIGS. 8 and 9.
Figure 11:
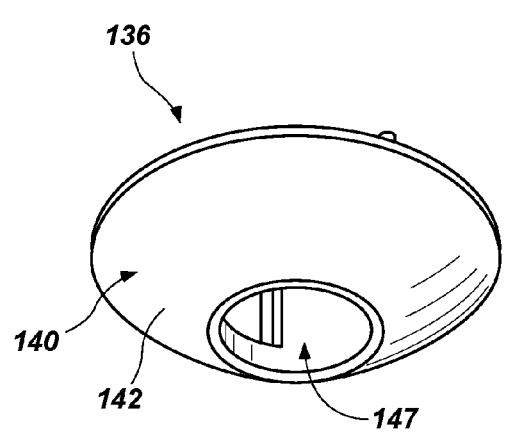
FIG. 11 illustrates a perspective view showing a reflective surface of the reflective structure shown in FIG. 10.
Figure 12:
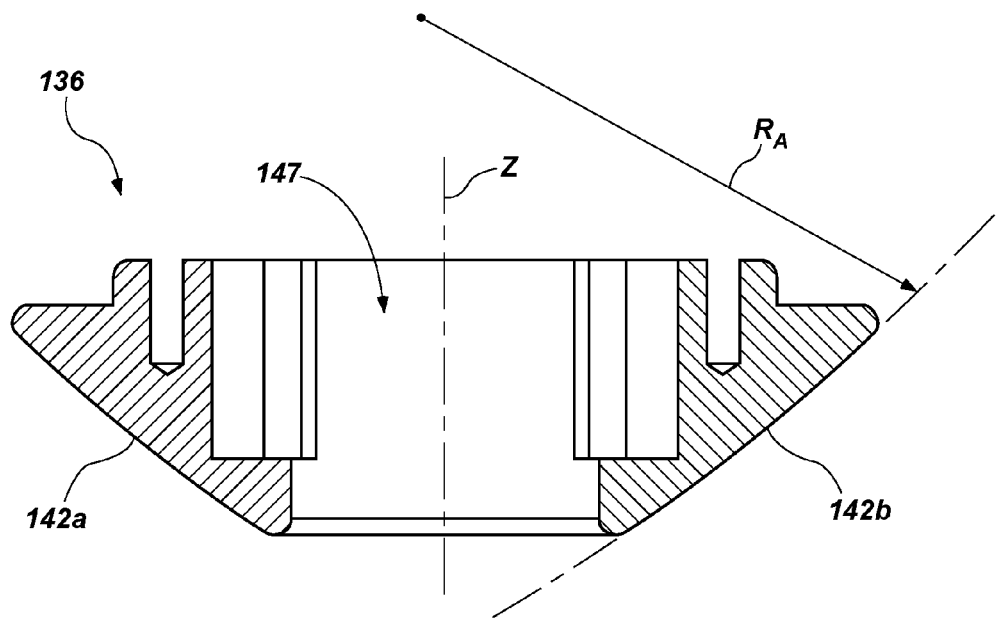
FIG. 12 illustrates a side, cross-sectional view of the reflective structure shown in FIGS. 10 and 11.

FIGS. 10 through 12 illustrate a second reflective structure 136 having an outward-facing reflective surface 142 with an arcuate profile that is configured for use in a mirror arrangement with the first reflective structure 130 illustrated in FIGS. 8 and 9. The second reflective structure 136 may include a top surface 143 and a recessed surface 145 surrounding a longitudinal aperture 147, wherein the longitudinal aperture 147 extends coaxial with longitudinal axis Z. The longitudinal aperture 147 may be configured to allow the image sensor 106 to view at least a bottom portion of a bottom gaming token in a stack of gaming tokens. The top surface 143 of the second reflective structure 136 may be planar and may be configured to be centrally affixed to the underside of the transparent cover 102 in a manner to be co-planar with the top, planar surface 129 of the first reflective structure 130. In embodiments wherein the top surface 143 of the second reflective structure 136 is centrally affixed to the underside of the transparent cover 102, the second reflective structure 136 may form the hub structure 134 previously described. In embodiments wherein the second reflective structure 136 forms the hub structure 134, one or more PCBs 144 carrying optional LEDs 107 may be mounted to the recessed surface 145 of the second reflective structure 136.

FIG. 12 illustrates a side, cross-sectional view of the second reflective structure 136 illustrated in FIGS. 10 and 11 bisected by a plane containing the longitudinal axis Z of the second reflective structure 136. The outward-facing reflective surface 142 of the second reflective structure 136 may extend 360 degrees around the longitudinal axis Z of the second reflective structure 136 and may face the inward-facing reflective surface 133 of the first reflective structure 130. As shown more clearly in FIG. 12, the outward-facing reflective surface 142 may have opposing, convex, arcuate cross-sectional profiles 142a, 142b. By way of non-limiting example, in embodiments wherein the opposing cross-sectional profiles 133a, 133b of the inward-facing reflective surface 133 are shaped as a segment of a prolate ellipse, as shown in FIGS. 8 and 9, each directly opposing cross-sectional profile 142a, 142b of the outward-facing reflective surface 142 may extend in an arc with a single radius $R_4$. By way of a further non-limiting example, if the opposing cross-sectional profiles 133a, 133b of the inward-facing reflective surface 133 are defined, as previously described, by a prolate ellipse with k=−0.5822 and R=25.6914, wherein the maximum and minimum diameters $D_1$, $D_2$ of the inward-facing reflective surface 133 are about 62.1 mm and about 41.7 mm, respectively, the outward-facing reflective surface 142 may taper arcuately from a maximum diameter $D_3$ of about 24.9 mm to a minimum diameter $D_4$ of about 9.0 mm along the opposing arcuate cross-sectional profiles 142a, 142b, wherein each cross-sectional profile 142a, 142b has a radius $R_4$ of about 53.0 mm.

It is to be appreciated that the inward-facing reflective surface 133 of the first reflective structure 130 and the outward-facing reflective surface 142 of the second reflective structure 136 may be respectively sized, shaped, configured and oriented in any manner to direct an image of the lateral side surface 146 of the stack of gaming tokens 124 onto the image sensor 106. For example, in alternative embodiments, the cross-sectional profiles 133a, 133b of the inward-facing reflective surface 133 of the first reflective structure 130 may be shaped as a section of a circle, oblate ellipse, parabola, hyperbola or any other shape sufficient to allow operability of the bet sensor 100. The inward-facing reflective surface 133 may have a maximum diameter $D_1$ in the range of about 40.0 mm to about 250.0 mm, and may taper, linearly or arcuately, to a minimum diameter $D_2$ in the range of about 10.0 mm to about 100.0 mm. The inward-facing reflective surface 133 may have an axial distance $L_1$ in the range of about 5.0 mm to about 50.0 mm as measured along the longitudinal axis Z, between surfaces of the inward-facing reflective surface 133 at the maximum and minimum diameters $D_1$, $D_2$. The outward-facing reflective surface 142 may have a maximum diameter $D_3$ in the range of about 5.0 mm to about 100.0 mm, and may taper, linearly or arcuately, to a minimum diameter $D_4$ in the range of about 0.0 mm to about 4.0 mm. The cross-sectional profiles 142a, 142b of the outward-facing reflective surface 142 may be shaped as a section of a circle, ellipse, parabola, hyperbola, or any other shape sufficient to allow operability of the bet sensor 100. In embodiments where the shape of the cross-sectional profiles of the inward- and outward-facing reflective surfaces 133, 142 are defined by a portion of a conic section, such as a circle, ellipse, parabola or hyperbola, the shape-imparting conic section may be defined by a conic constant k in the range of about −8.0 to 2.0 and R in the range of about 10.0 mm to about 300.0 mm.

Figure 13:
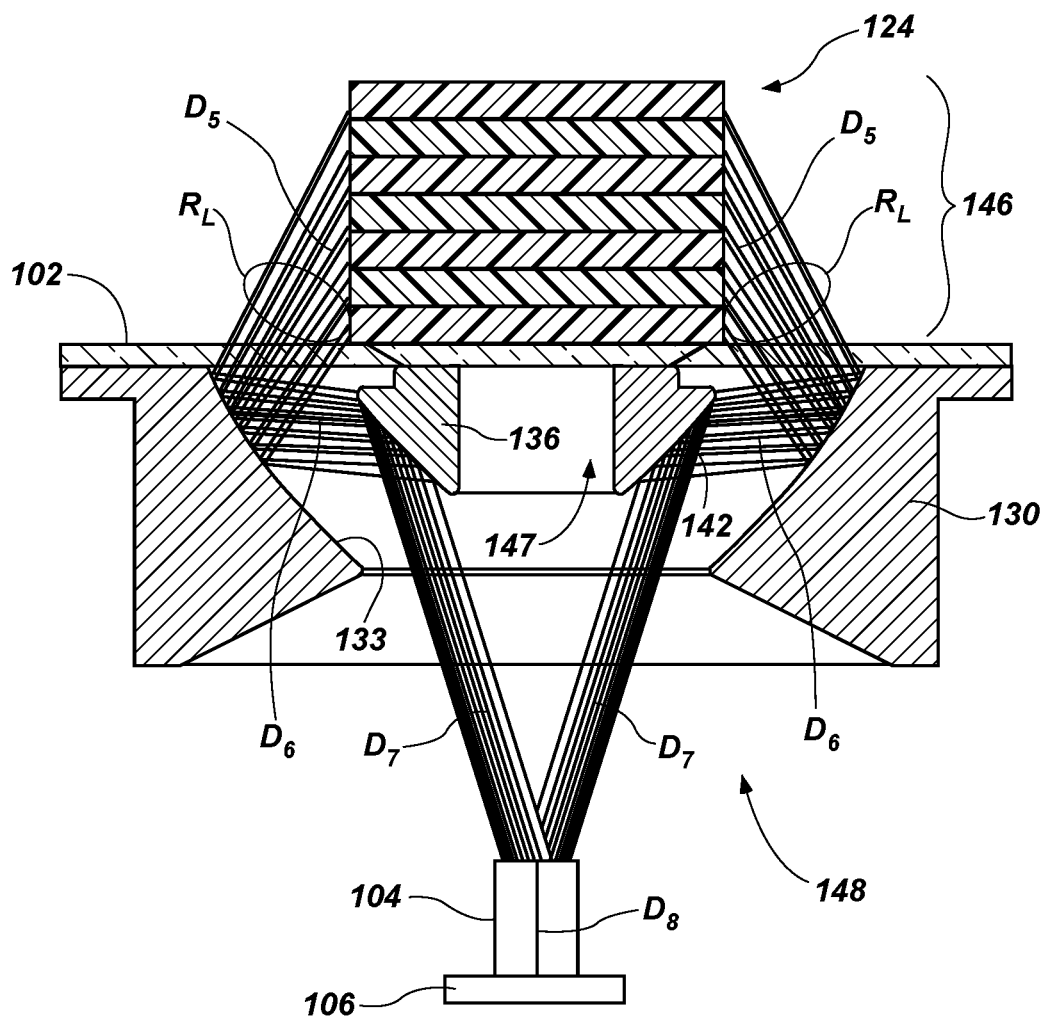
FIG. 13 illustrates a side, cross-sectional view of components of a bet sensor including the reflective structures shown in FIGS. 8 through 12, further depicting image light rays being directed onto an image sensor from a stack of gaming tokens on the bet sensor.

FIG. 13 illustrates a cross-sectional view of a mirror arrangement including the first reflective structure 130 shown in FIGS. 8 and 9 and the second reflective structure 136 shown in FIGS. 10 through 12. Similar to the manner described above in reference to FIG. 7, the first and second reflective structures 130, 136 shown in FIG. 13 are sized and arranged relative to one another such that light rays $R_L$, including ambient light rays and/or illumination light rays emitted by the optional LEDs 107, are reflected off the lateral side surface 146 of the stack of gaming tokens 124 through the transparent cover 102 toward the inward-facing reflective surface 133 of the first reflective structure 130. The light rays are reflected from the inward-facing reflective surface 133 of the first reflective structure 130 toward the outward-facing reflective surface 142 of the second reflective structure 136, from which the light rays are reflected onto the image sensor 106. The average light ray travel distance between two components of the bet sensor 100 may be defined as the average distance a light ray may travel between the two respective components of the bet sensor 100 in a plane bisecting the concentrically-aligned inward- and outward-facing reflective surfaces 133, 142 and containing the longitudinal axis Z thereof.

The average light ray travel distance may be determined using light ray tracer software to plot a dispersion of light rays $R_L$ reflected off the lateral side surface 146 of the stack of gaming tokens 124 through the transparent cover 102 toward the inward-facing reflective surface 133 and reflected therefrom onto the outward-facing reflective surface 142. After the dispersion of light rays $R_L$ is plotted, the average travel distance of the light rays $R_L$ in the dispersion of light rays may be calculated between two components of the bet sensor. In the embodiment illustrated in FIG. 13, the mirror arrangement may be sized, configured and oriented to provide an average light ray travel distance $D_5$ between the lateral side surface 146 of the stack of gaming tokens 124 and the inward-facing reflective surface 133 of about 26.4 mm and an average light ray travel distance $D_6$ between the inward-facing reflective surface 133 and the outward-facing reflective surface 142 of about 17.2 mm when the inward- and outward-facing reflective surfaces 133, 142 are respectively sized, configured and oriented as previously described in reference to FIG. 12. Alternatively, the mirror arrangement may be sized, configured and oriented to provide an average light ray travel distance $D_5$ between the lateral side surface 146 of the stack of gaming tokens 124 and the inward-facing reflective surface 133 in the range of about 15.0 mm to about 110.0 mm and an average light ray travel distance $D_6$ between the inward-facing reflective surface 133 and the outward-facing reflective surface 142 in the range of about 5.0 mm to about 100.0 mm.

Referring now to FIGS. 7 and 13, an optional lens 104 or other optical components may be located between the second reflective structure 136 and the image sensor 106 and may be configured to focus or otherwise manipulate the light rays impinging on the image sensor 106 and forming an image of the stack of gaming tokens 124. The lens 104 may comprise what is referred to in the art as a "micro video lens." In other embodiments, the lens 104 may comprise what is referred to as a "folding lens." The lens 104 may be selected based on minimum requirements of modulation transfer function (MTF) and distortion. It is to be appreciated that in some embodiments, the lens 104 may be omitted and the image may be reflected from the second reflective structure 136 directly onto the image sensor 106. In embodiments where a lens 104 is utilized, an average light ray travel distance $D_7$ between the outward-facing reflective surface 142 of the second reflective structure 136 and the lens 104 may be about 16.6 mm, while an average light ray travel distance $D_8$ between the lens 104 and the image sensor 106 may be about 10.2 mm. In other embodiments, the average light ray travel distance $D_7$ between the outward-facing reflective surface 142 and the lens 104 may be in the range of about 7.0 mm and about 60.0 mm, while the average light ray travel distance $D_8$ between the lens 104 and the image sensor 106 may be in the range of about 5.0 mm and 50.0 mm.

Figure 14A:
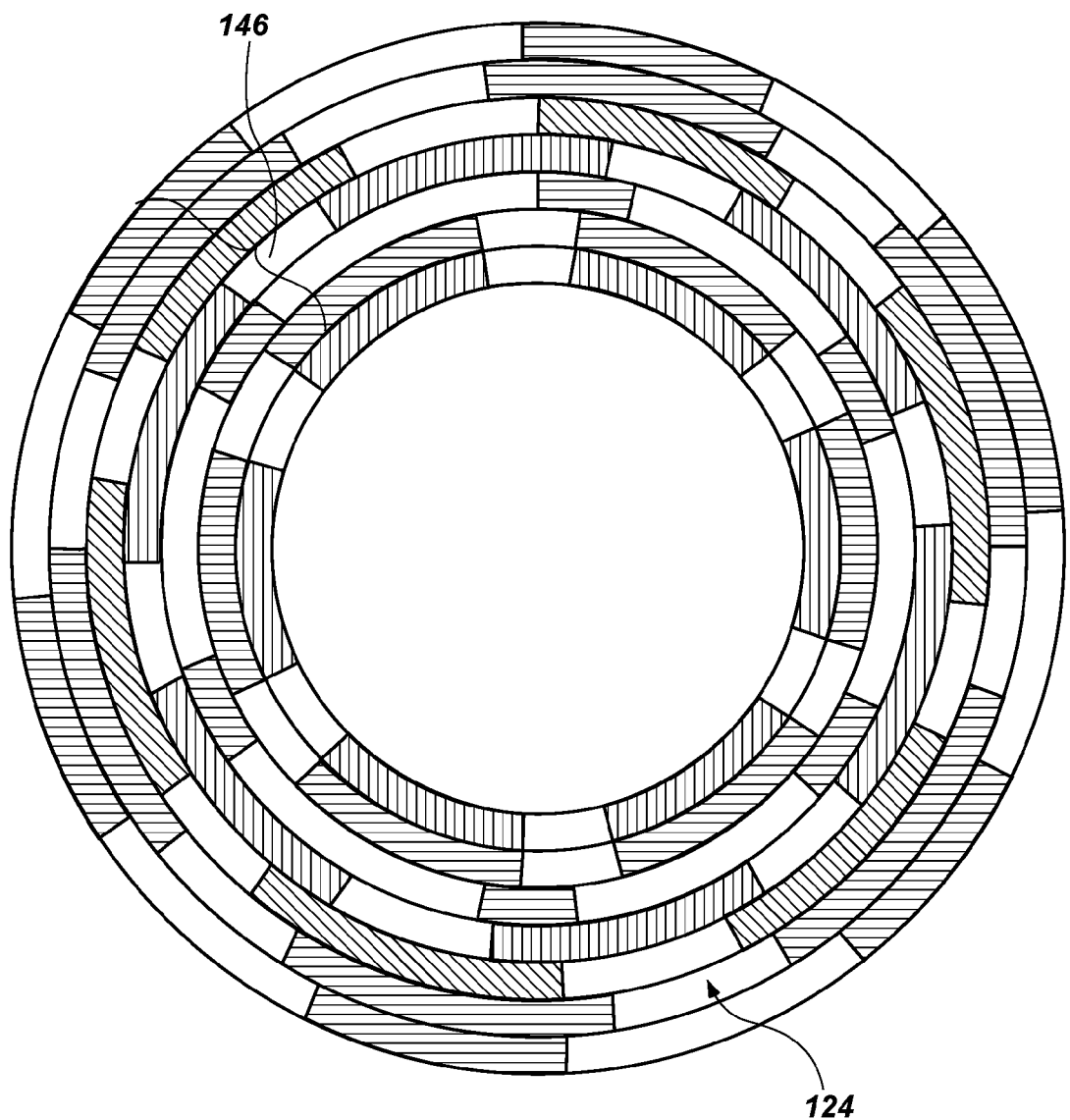
FIG. 14A illustrates a plan view of a two-dimensional image of the three-dimensional lateral side surface of a stack of gaming tokens supported on the bet sensor that may be acquired by using a bet sensor as described with reference to FIGS. 1 through 13.

The configuration of each of the first and second reflective structures 130, 136 having a respective reflective surface 133, 142 extending substantially entirely around a respective circumference of each of the reflective structures 130, 136 provides a two-dimensional image on the image sensor 106 representing a 360-degree view of the entire circumference of the lateral side surface 146 of the stack of gaming tokens 124 on the bet placement surface of the transparent cover 102. Such an image may be referred to in the art as a "pericentric" or "hypercentric" image. Such an image may also be referred to as a "radial" format. In this manner, the image sensor 106 may capture a two-dimensional image representing a 360-degree view of the entire circumference of the three-dimensional lateral side surface 146 of the stack of gaming tokens 124, as shown in FIG. 14A. In the pericentric image of the stack of gaming tokens as shown in FIG. 14A, the lateral side surface of each gaming token is represented as an annular shape. The annular shapes representing the lateral side surfaces of the gaming tokens are concentrically located relative to one another in the pericentric image when the chips are vertically aligned, with the annular shapes corresponding to lateral side surfaces of gaming tokens at the bottom of the stack being located closer to the center of the image and the annular shapes corresponding to lateral side surfaces of gaming tokens at the top of the stack being located at the outer radial periphery of the image.

In some embodiments, the image sensor 106 may comprise a complementary metal-oxide-semiconductor (CMOS) image sensor. The CMOS image sensor may be a color sensor or a black and white sensor and may be of the type used in a conventional CMOS camera.

Figure 15:
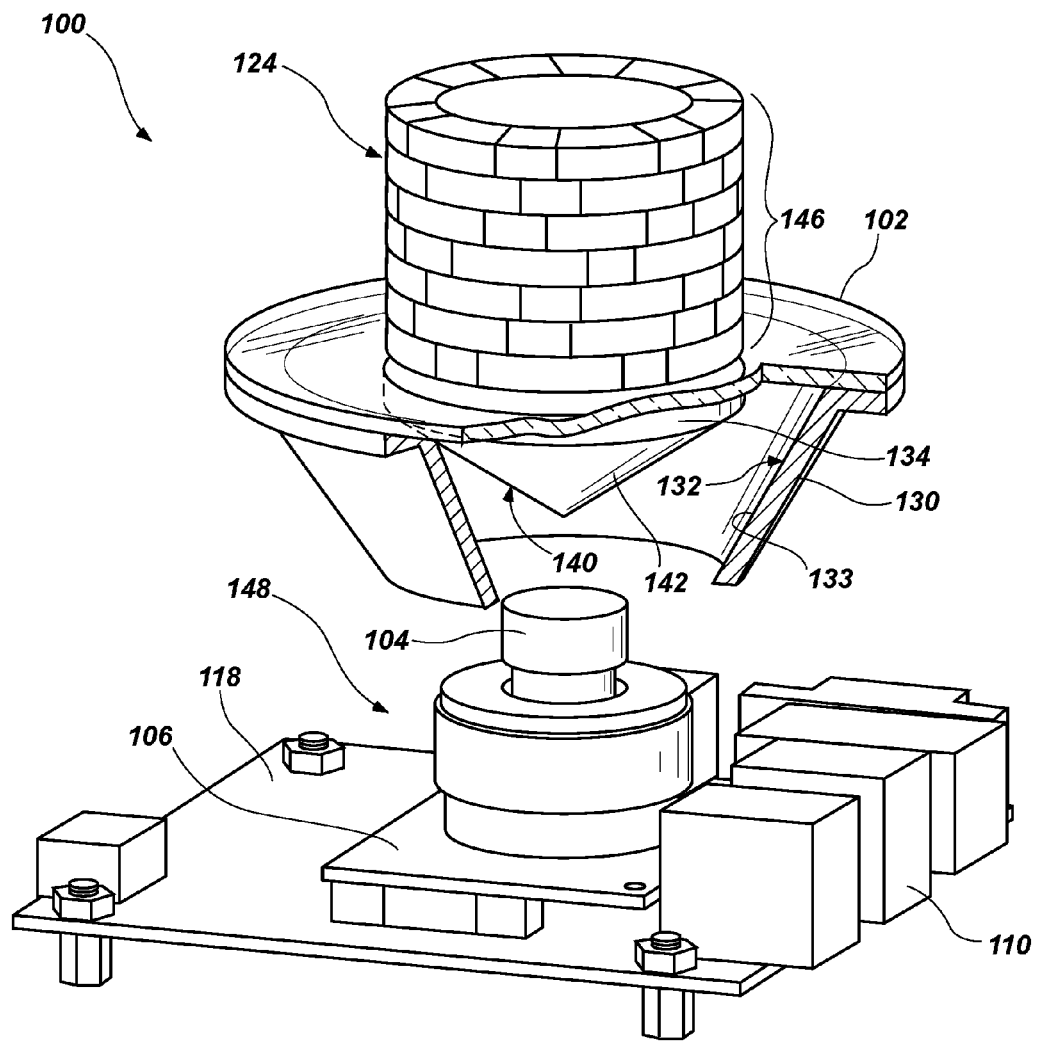
FIG. 15 illustrates a partially cut-away perspective view of components of a bet sensor as described with reference to FIGS. 1 through 7.

As shown in FIG. 15, the image sensor 106 may be part of an image sensor module 148 (see also FIG. 13) comprising a printed circuit board 118 to which the image sensor 106 is mounted. The lens 104 may mounted to the image sensor 106 on the image sensor module 148. In some embodiments, the processor 110 of the bet sensor (100) may be mounted to the image sensor unit, as shown in FIG. 15.

The image sensor 106 may be selected based on performance factors including cost, resolution, light sensitivity, and ease of integration with the processor 110. Because most gaming tokens may be uniquely identifiable according to chip color and markings on the lateral side of the token, the illumination unit 120 (FIGS. 2 and 3) and the image sensor module 148, including the image sensor 106, may be optimized to meet a basic minimum standard for image quality sufficient to allow the processor 100 to accurately recognize the color and general patterns of substantially the entire circumference of the lateral side surface 146 of each token in the stack of gaming tokens 124. By way of non-limiting example, the image sensor 106 may be one of a model OV9715, a model OV10620, or a model OV3642 CMOS image sensor commercially available from OmniVision Technologies Inc., of Santa Clara, Calif. By way of further non-limiting example, the image sensor 106 may be one of a model MT9V024, a model MT9D131, or a model MT9V032 CMOS image sensor commercially available from Aptina Imaging Corp., of San Jose, Calif.

Window imaging techniques may be used in connection with the image sensor 106. For example, various window imaging sizes on the image sensor 106 may be selectively used to capture images of substantially the entire circumference of the lateral side surface 146 of the stack of gaming tokens 124. In some embodiments, a 32 mm window diameter may be utilized in the CMOS image sensor 106. In other embodiments, a 62 mm window diameter may be utilized in the CMOS image sensor 106. In yet other embodiments, a 75 mm window diameter may be utilized in the CMOS image sensor 106. In still yet other embodiments, a window diameter greater than 75 mm may be utilized in the CMOS image sensor 106. In other embodiments, other image sensors may be utilized, such as, by way of a non-limiting example, charge-coupled device (CCD) image sensors. It is to be appreciated that any type or model of image sensor capable of capturing an image of the lateral side surface of a stack of gaming tokens is within the scope of the embodiments disclosed herein.

As described previously in reference to FIG. 1, the image sensor 106 may be in electronic communication with the processor 110. The processor 110 may be located on the PCB 118 proximate the image sensor module 148. The image sensor 106 is also operatively coupled to the PCB 118 and may communicate electronically with the processor 110 through conductive vias, traces, interconnects, or a combination thereof. In other embodiments, a wire or cable may extend from the image sensor 106 directly to the processor 110. For example, an ETHERNET® cable or a cable extending between corresponding USB ports on or communicating with the image sensor 106 and the processor 110, respectively, may extend between and provide communication between the processor 110 and the image sensor 106. Alternatively, a wire or cable may extend from the image sensor 106 to an intermediate component on the PCB. In yet other embodiments, the image sensor 106 may communicate wirelessly with the processor 110.

In addition to controlling the LEDs 107 of the illumination unit 120 (FIGS. 2 and 3), the processor 110 may be configured under control of a computer program to control the image sensor 106 to capture images of the stack of gaming tokens 124 and transmit the images to the processor 110. The processor 110 may be configured under control of a computer program to perform one or more algorithms using the acquired image(s) of the stack of gaming tokens 124 and to determine a sum value of the stack of gaming tokens 124 supported on the bet placement surface 122 of the transparent cover 120. For example, the processor 110 may be configured to perform at least two functions in the processing of images of a stack of gaming tokens 124: token pattern calibration and token pattern detection. As previously described, the value of a single gaming token may be determined by recognizing the color and spatial patterns or markings on the lateral side surface of the token. In other embodiments, the value may be determined by color alone, markings alone or patterns alone.

The pattern calibration software and algorithms may allow a user to store in the processor memory a reference image of an entire circumference of a lateral side surface of each unique token in a set of gaming tokens. The reference image may be an image captured by the image sensor 106 of a unique token, or "reference token," placed on the bet placement surface 122 of the bet sensor 100 and illuminated by the illumination unit 120, as previously described. The processor 110 may perform an algorithm to convert the 360-degree view of the entire circumference of the lateral side surface of the reference token into an image showing a linear depiction, which may also be characterized herein as a linear format, a linearly formatted image or a linear layer, of the entire circumference of the lateral side surface of the reference token. Once the image is converted into a linear depiction in such a manner, the processor 110 may perform an edge detection algorithm on the reference image to identify the edges of the depicted reference token. After the edges of the reference token are identified, the processor 110 may examine the areas of the token internal to the edges to identify qualities of the patterns in these areas, such as the color and size of the patterns. To do so, at least one line having a plurality of reference points may be projected through the linear depiction of the entire circumference of the lateral side surface of the reference token. The processor 110 may then perform an algorithm to identify the color intensity at each reference point on each line extending through the entire circumference of the lateral side surface of the reference token for each of the red, green and blue colors on a red, green, blue (RGB) color scale. After the processor 110 has identified the color intensity for each color on the RGB scale at each reference point on the line, a reference graph may be plotted and stored in the processor memory charting the color intensity for each color on the RGB scale at each reference point on the line. The processor 110 may correlate the reference graph with a unique token value previously input by an operator of the bet sensor during setup. In one embodiment, multiple lines are drawn through the pericentric image, and each line intersects a center point of the pericentric image. Histograms of the RGB values may be analyzed to locate the boundaries between chips and determine the number of chips in the stack.

The token pattern detection software and algorithms allow wager images comprising captured images of gaming tokens 124 placed by a player as part of a bet to be compared with the reference images for each token stored in the processor memory. As previously described, the image sensor 106 may transmit wager images to the processor 110. The wager images may be continuously streamed from the image sensor 106 to the processor 110 and subsequently captured by the processor 110, or, alternatively, the wager images may be captured by the image sensor 106 and transmitted to the processor 110. The wager images may be stored in the processor memory while the processor 110 performs one or more algorithms to determine the value of the stack of gaming tokens 124 depicted in the wager images. The processor 110 may perform an algorithm to convert the 360-degree view of the entire circumference of the lateral side surface of the stack of gaming tokens 124 in the wager image into an image showing a linear depiction of the entire circumference of the lateral side surface of the stack of gaming tokens 124. Once the image is converted into a linear depiction in such a manner, the processor 110 may perform an edge detection algorithm on the wager image to identify the edges of each of the depicted tokens in the stack of gaming tokens 124. After the edges of the tokens are identified, the processor 110 may examine the areas of the tokens internal to the edges to identify qualities of the patterns in these areas, such as the color and size of the patterns. To do so, at least one line having a plurality of reference points may be projected through the linear depiction of the entire circumference of the lateral side surface of each token in the wager image, according to the manner previously described with respect to the reference image, to obtain a token graph charting the color intensity for each color on the RGB scale at each reference point on the line for each token in the wager image. Subsequently, the processor may compare the token graph for each token in the wager image to each reference graph stored in the processor memory until the processor identifies the stored reference graph having RGB color intensity characteristics most closely corresponding to each token graph. The processor 110 may then add the unique token values derived for each token in the wager image to calculate a sum wager value of the stack of gaming tokens 124 depicted in the wager image. It is to be appreciated that such processes and algorithms performed by the processor 110 to obtain token graphs for each token in a wager image will result in a high degree of accuracy regardless of whether the stack of gaming tokens 124 wagered by a player is illuminated by the illumination unit 120 or by ambient light only.

Figure 14B:
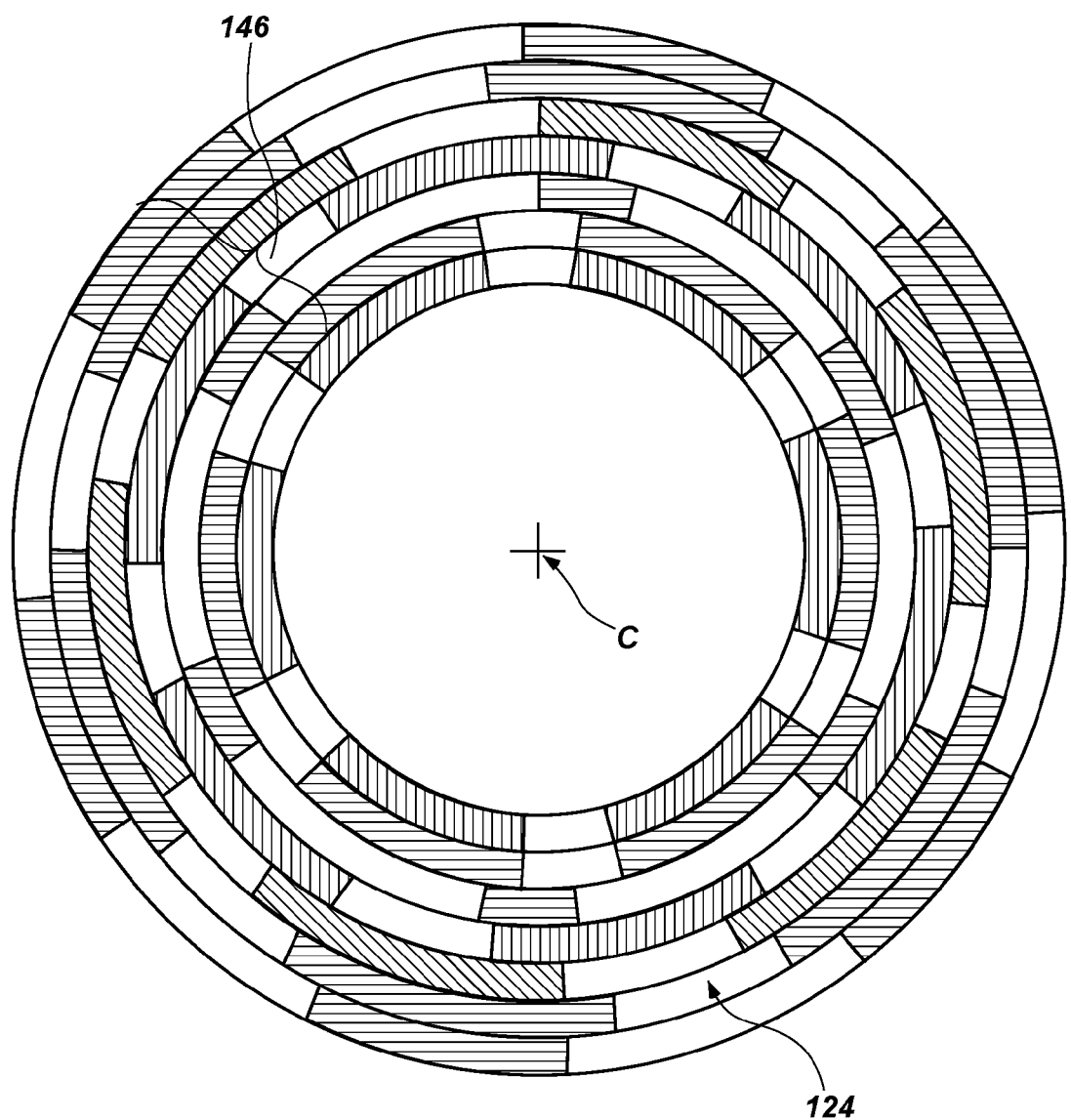
FIG. 14B illustrates a plan view of the two-dimensional image shown in FIG. 14A having the center of the two-dimensional image located.
Figure 14C:
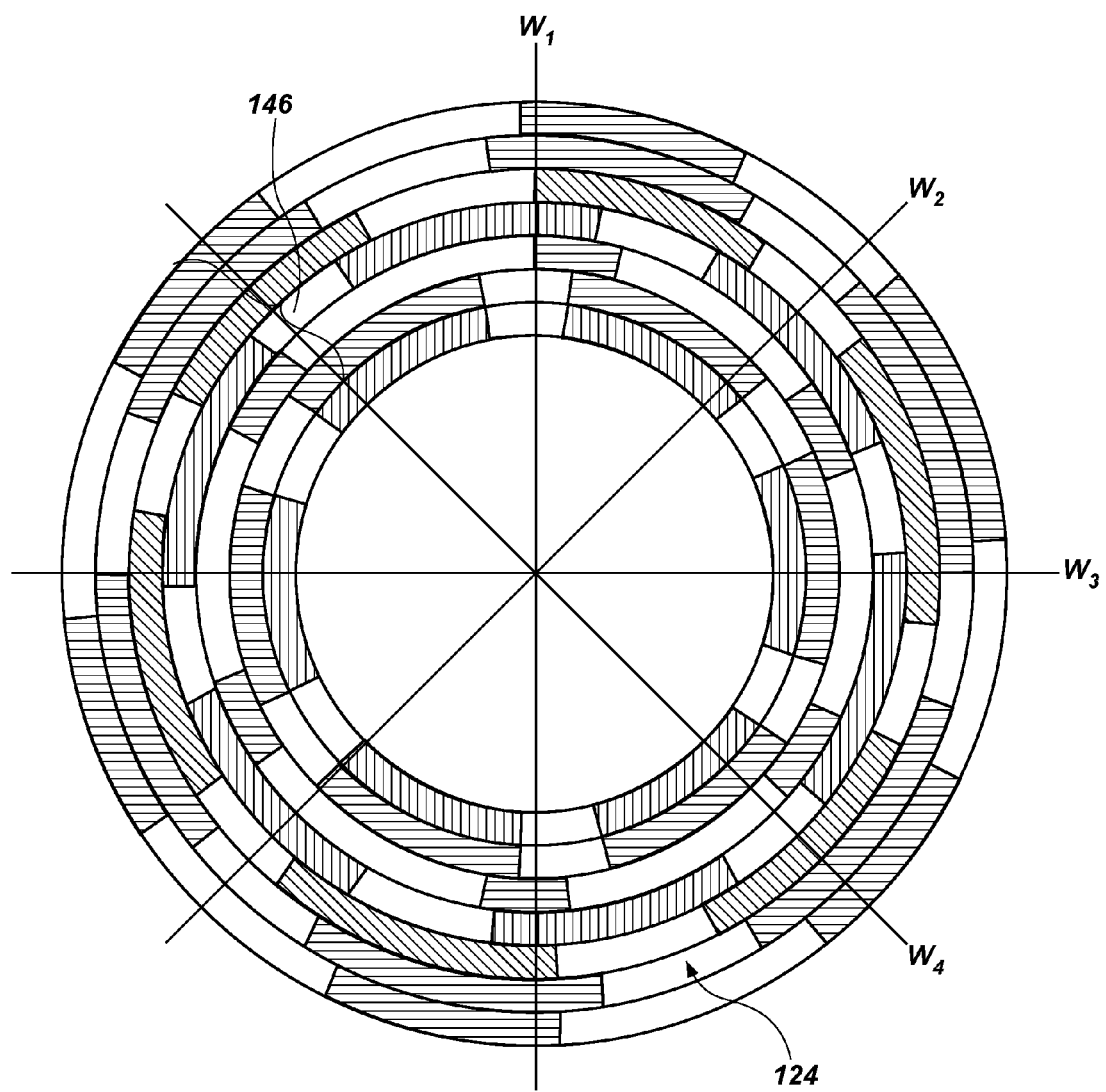
FIG. 14C illustrates a plan view of the two-dimensional image shown in FIG. 14B having four lines superimposed over the image and extending through the center of the image.

In one potential alternative method, after the wager image is captured and transmitted to the processor 110 by the image sensor 106, the processor 110 may utilize software to extract data from the pericentric wager image for comparison with data of reference images for each token stored in the processor memory. Referring now to FIG. 14B, pixel data present in the wager image may be used to extract information about the gaming tokens 124 displayed therein. For example, if the center C of the pericentric wager image has been located, it is to be appreciated that a number of lines extending through the center C will pass through the lateral side surfaces (or pericentric "rings") of the gaming tokens 124 illustrated in the wager image. The lines may also pass through the various colored regions of the rings in the wager image. FIG. 14C illustrates the wager image of FIG. 14B having four (4) lines $W_1$, $W_2$, $W_3$, $W_4$ extending through the center C of the wager image and passing through the rings, including the various colored portions. The pixel data contained in the wager image may include the color on the RGB color scale of the pixels intersected by each of the lines $W_1$, $W_2$, $W_3$, $W_4$.

Figure 14D:
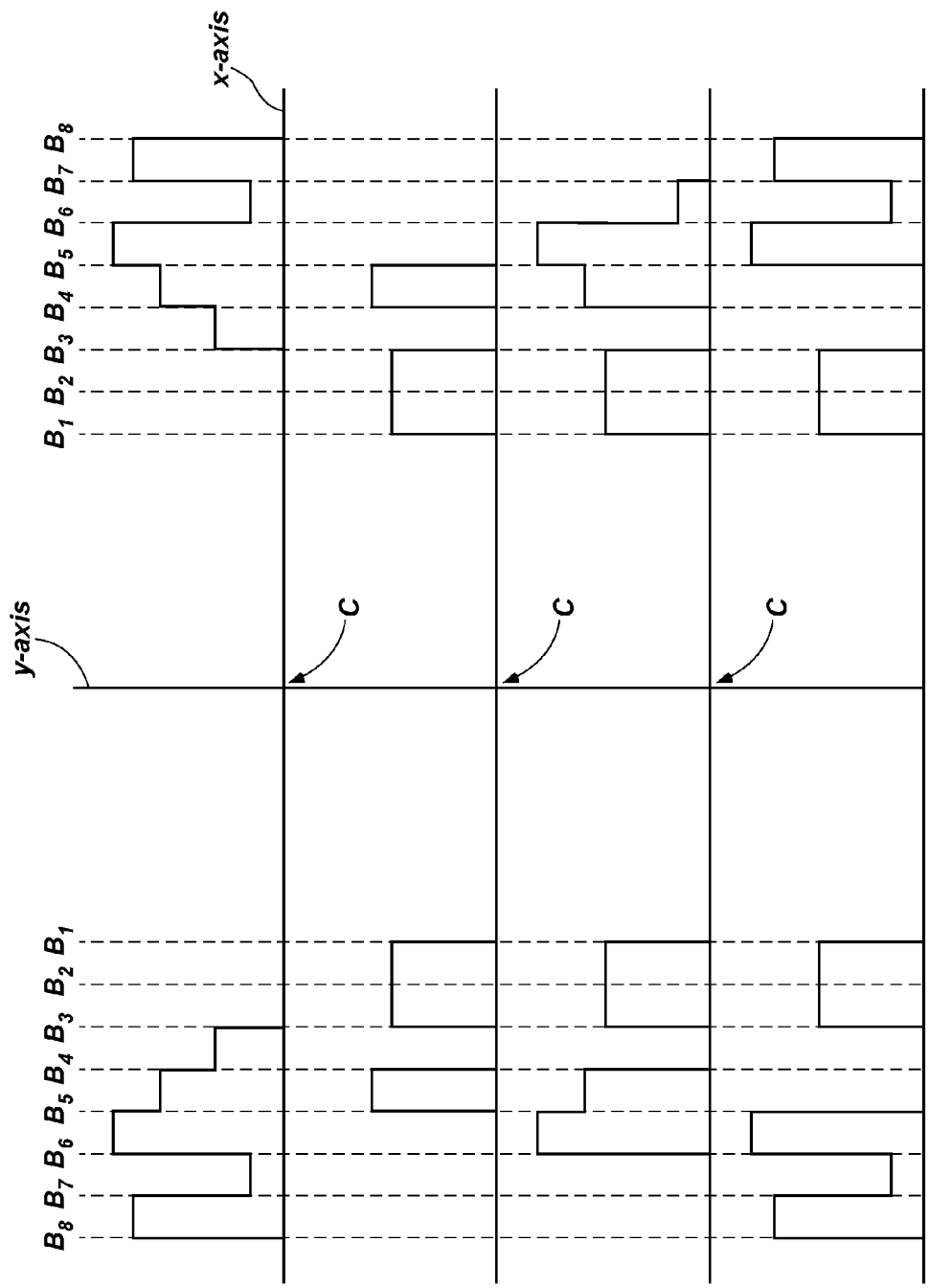
FIG. 14D illustrates four graphs corresponding to the four lines shown in FIG. 14C, wherein each graph represents a plot of red pixels of the RGB color scale along one of the lines shown in FIG. 14C.

Referring now to FIG. 14C, a plot of four (4) graphs is illustrated representing plots of red pixels of the RGB color scale along each of the lines $W_1$, $W_2$, $W_3$, $W_4$ (FIG. 14C). As shown in FIG. 14D, the x-axis of each plot represents the distance from the center C of the pericentric wager image along each line, and the y-axis represents the ratio of red pixels to green or blue pixels intersected by the line at a given reference band centered at each respective reference point along the x-axis. In this manner, each plot provides an indication of the varying degrees to which the image appears red along the x-axis. At locations along the x-axes corresponding to locations of the wager image where the respective line intersects the transition between the ring of a first gaming token and the ring of a second, adjacent gaming token, the corresponding value on the y-axes will transition from one substantially constant red value representing the first ring to another substantially constant red value representing the second, adjacent ring.

It is to be appreciated that if the x-axes of the plots for each of the lines $W_1$, $W_2$, $W_3$, $W_4$ are aligned, with the center C of the pericentric image located at the origin of the x-axes, the transition points in the y-values of the plots will also be aligned at corresponding x-values in each of the plots, shown in FIG. 14D as boundaries $B_1$-$B_8$. The transition points on the graphs correspond to the boundaries between adjacent rings in the wager image. The first boundary $B_1$ represents the edge of the colored marking on the underside of the lowermost, or "first," gaming token in the stack of gaming tokens along the lines $W_1$, $W_2$, $W_3$, $W_4$; the second boundary $B_2$ represents the transition from the underside to the lateral side surface of the first gaming token; the third boundary $B_3$ represents the transition between the lateral side surface of the first gaming token to the lateral side surface of a second gaming token, and so forth, and the last boundary, shown as $B_8$ in FIG. 14D, represents the top edge of the lateral side surface of the uppermost, i.e., "top" or "last," gaming token in the stack of gaming tokens 124. In this manner, by aligning the plots and plotting the boundaries between adjacent gaming tokens through the x-axis of each graph, each distinct ring in the wager image may be identified from the regions on the x-axes located between adjacent boundaries of the boundaries $B_1$-$B_8$.

Once each distinct ring in the wager image is identified as a region on the x-axes located between adjacent boundaries of the boundaries $B_1$-$B_8$, the degree of redness of each boundary, represented by the y-values, may be extrapolated for comparison to corresponding data extrapolated from the reference images for each gaming token 124 stored in the processor memory. It will be appreciated that the accuracy of the comparison is increased as the number of lines extending through the center C of the wager image is increased. After each distinct ring in the wager image is identified as a corresponding region on the x-axes located between adjacent boundaries of the boundaries $B_1$-$B_8$, the total number of red pixels within each ring intersected by each of the lines $W_1$, $W_2$, $W_3$, $W_4$ may be calculated to acquire a total red pixel value for each ring. In a similar manner, separate green and blue RGB graphs along each of lines $W_1$, $W_2$, $W_3$, $W_4$ may be plotted and aligned to acquire a total green pixel value and a total blue pixel value for each ring. The total red, green, and blue pixel values for each ring may be combined to acquire a wager RGB signature for each ring. The wager RGB signature for each ring may then be compared to corresponding RGB signatures of gaming tokens 124 depicted in reference images until the stored RGB signature that most closely corresponds to the wager RGB signature for each ring is identified. In this manner, pixel data from the wager image may be extracted and manipulated for comparison with reference images previously stored.

The processor 110 may be configured to run software to extract and manipulate data in the wager image for comparison with reference image data stored in the processor memory. For example, the processor 110 may run pattern recognition software, including, by way of non-limiting example, edge detection software, as is known in the art, to locate the center C of the pericentric wager image. After the center C of the pericentric wager image is located, pixel data, including RGB pixel color or intensity, along lines extending through the center C of the wager image may be acquired by the processor 110. Such pixel data may include the pixel data for the various colored regions of the rings in the wager image. The processor 110 may utilize the acquired pixel data to further identify the boundaries between adjacent rings in the pericentric wager image. Once the boundaries between adjacent rings are identified, the processor 110 may organize the acquired pixel according to each ring in the wager image to acquire a pixel data signature for each ring. The pixel data signature for each ring in the wager image may include an RGB pixel signature for each ring. The processor 110 may then compare the pixel data signature for each ring in the wager image with corresponding pixel data signatures for the reference images stored in the processor memory until the processor 110 identifies the reference image with the pixel data signature most closely corresponding to the pixel data signature of each respective ring in the wager image. Subsequently, the processor 110 may assign to each ring in the wager image a wager value associated with the corresponding stored pixel data signature. The processor 110 may then add the wager values assigned to each ring in the wager image to calculate a sum wager value of the stack of gaming tokens 124.

Alternatively, the reference image for each unique token may comprise a composite image of the entire circumference of the lateral side surface of the token. In some embodiments, the composite image may be derived from at least two base images stored in the processor memory, including at least one base image of the token illuminated by ambient light and at least one base image of the token illuminated by the illumination unit 120. The stored base images for each unique token may be processed to form a single grayscale composite image of the token in the processor memory. The composite image may be further processed and assigned a composite value by the processor 110. To derive the composite value for each composite image, according to one non-limiting example, the processor 110 may perform an edge detection algorithm on the composite image to identify the edges of the depicted token. After the edges of the token are identified, the processor 110 may examine the areas of the token internal to the edges to identify qualities of the patterns in these areas, such as the shape, size, and grayscale shade of the patterns. Subsequently, the processor 110 may assign the image a reference designation derived from processing a set of sub-values, the set of sub-values comprising a sub-value for each of at least the processed shape, size, and grayscale shade qualities of the internal areas of the depicted token. The reference designation may comprise a single value derived from processing the set of sub-values, or, alternatively, may comprise a listing of the set of sub-values. The processor 110 may correspond the reference designation with a unique token value previously input by an operator of the bet sensor 100 during setup. The unique token value may be equivalent to the actual monetary value of the token.

In other embodiments, a single base image, taken under ambient light, of substantially the entire lateral side surface of each unique token may be stored in the processor memory. In such embodiments, the stored base image may be further processed to form a corresponding second base image altered to represent an image of the unique token illuminated by the illumination unit 120. Thus, the stored base images for each unique token may be processed to form a single grayscale composite image of the unique pattern on the lateral side surface of the associated token. The composite image may then be stored in the processor memory. In such an embodiment, the token depicted in the composite image may be further processed and assigned a unique token value, as previously described.

In yet other embodiments, a single base image, taken under light emitted by the illumination unit 120, of substantially the entire lateral side surface of each unique token may be stored in the processor memory. In such embodiments, the stored base image may be further processed to form a corresponding second base image altered to represent an image of the unique token illuminated only by ambient light. Thus, the stored base images for each unique token may be processed to form a single grayscale composite grayscale image of the unique pattern on the lateral side surface of the associated token. The composite image may then be stored in the processor memory. In such an embodiment, the token depicted in the composite image may be further processed and assigned a unique token value, as previously described.

In further embodiments, a single base image, taken either under ambient light or light emitted by the illumination unit 120, of substantially the entire lateral side surface of each unique token may be stored in the processor memory and may be further processed to store in the processor memory a grayscale reference image of the unique pattern on the lateral side surface of the associated token. The token depicted in the grayscale reference image of such an embodiment may be further processed and assigned a unique token value, as previously described. It is to be appreciated that any method of storing in the processor memory an image of the unique pattern on the lateral side surface of an associated token is within the scope of the embodiments of the present disclosure.

As previously described, the token pattern detection software and algorithms allow wager images comprising captured images of gaming tokens 124 placed by a player as part of a bet to be compared with the reference images for each token stored in the processor memory. The processor 110 may convert each wager image into grayscale and subsequently perform an edge detection algorithm to identify the edges of the depicted token, as described previously. After the edges of each token in the wager image are identified, the processor 110 may examine and process the areas of each token internal to the edges thereof to identify one or more of the shape, size, and grayscale shade of the patterns within the edges of the depicted tokens. Subsequently, the processor 110 may assign each token depicted in the wager image a token designation derived from processing a set of sub-values, the set of sub-values comprising a sub-value for one or more of the processed shape, size, and grayscale shade qualities of the internal areas of the depicted token. The token designation may comprise a single value derived from processing the set of sub-values, or, alternatively, may comprise a listing of the set of sub-values. The processor 110 may then compare the token designation with the reference designations stored in the processor memory until the processor identifies the stored reference designation most closely corresponding to the token designation. Subsequently, the processor 110 may associate the token designation with the unique token value stored in association with the corresponding reference designation. The processor 110 may then add the unique token values derived for each token in the stack of gaming tokens 124 to calculate a sum wager value of the stack of gaming tokens 124.

Figure 21:
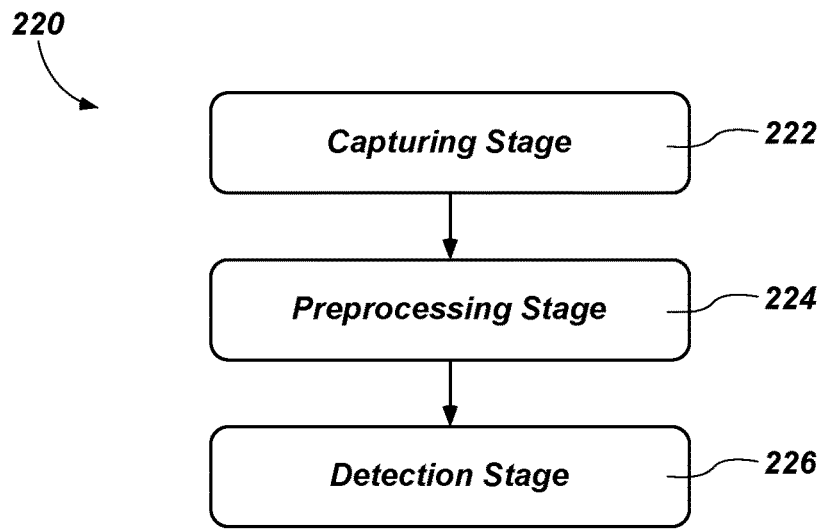
FIG. 21 illustrates a diagram of a token pattern detection algorithm, according to an embodiment of the present disclosure.

Referring now to FIG. 21, a token pattern detection algorithm 220 is shown according to an example embodiment of the present disclosure. The algorithm 220 may include three (3) stages: a capturing stage 222, a preprocessing stage 224, and a detection stage 226. In the capturing stage 222, pericentric images of the circumference of the lateral side surface 146 of the stack of gaming tokens 124 are acquired by the image sensor 150 and converted to a predetermined image format for further processing during the preprocessing stage 224. In the preprocessing stage 224, the pericentric images may be processed to identify layers therein representing the lateral side surfaces of individual tokens within the stack and to convert each of the layers into a linear orientation, which may also be characterized as a format, for further processing. In the detection stage 226, the processor 110 may identify and correlate patterns within each linear layer of the stack with known patterns stored in the processor memory.

During the capturing stage 222, the image sensor 150 may capture and transmit an image of the circumference of the lateral side surface 146 of the stack of gaming tokens 124 using a video capture and output program in combination with a camera driver and media controller architecture. By way of non-limiting example, the image sensor 150 may be an APTINA® sensor patched to run a LINUX® distribution operating system. The video capture and output program may be Video for Linux 2 (also known as "V4L2"). In this example, the processor 110 may include a BEAGLEBOARD® processing platform operating the V4L2 program, the camera driver, and the media controller architecture on LINUX® distribution. The camera driver may be configured to limit the output image to a region of interest containing substantially only the lateral side surface of the stack of gaming tokens. The media controller architecture configured as described above may output the image in a raw 12-bit BGGR Bayer format. The processor 110 may operate the V4L2 program and media controller to convert the 12-bit BGGR Bayer format image to a 12-bit RGB format image and further convert the 12-bit RGB format image into an 8-bit RGB format image.

In some embodiments, the processor 110 may effectively synchronize the capture of images by the image sensor 150 with illumination of the lateral side surface 146 of the stack of gaming tokens 124 by the illumination unit 120 by identifying the illumination intensity of the captured images and deleting or otherwise removing those images having an illumination intensity falling below a predetermined threshold.

Figure 22:
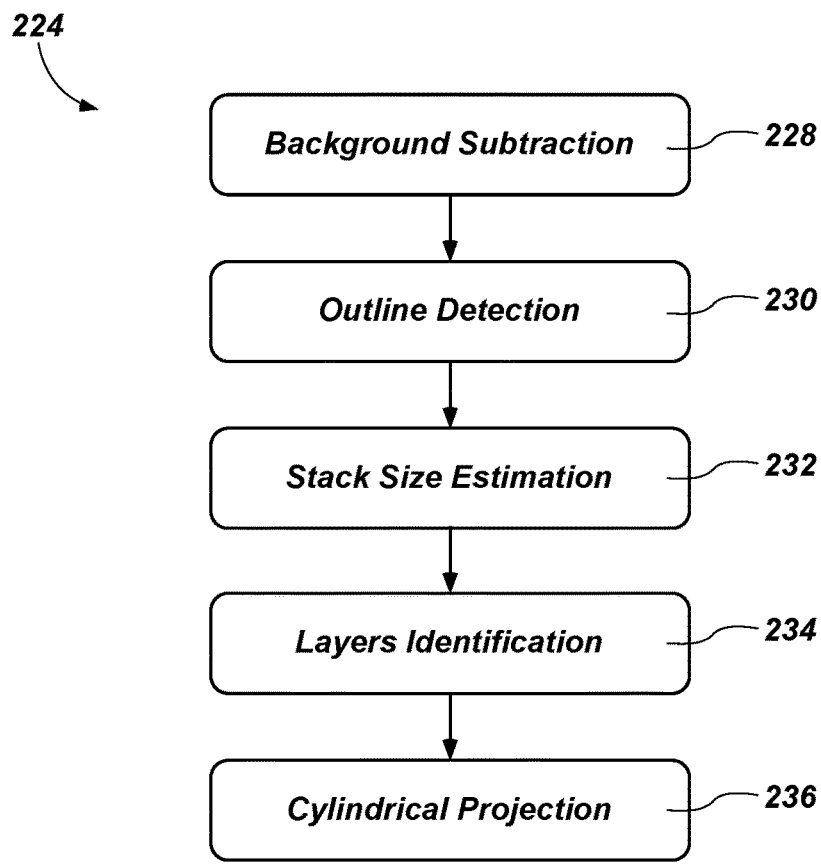
FIG. 22 illustrates a diagram of a preprocessing stage of the token pattern detection algorithm of FIG. 21.

FIG. 22 illustrates a flowchart of a method performed on captured images at the preprocessing stage 224. In the preprocessing stage 224, pericentric images of the circumference of the lateral side surface 146 of the stack of gaming tokens 124 captured by the image sensor 150 and formatted by the media controller are manipulated to generate images that are suitable for pattern correlation by the processor 110. The preprocessing stage 224 may include a background subtraction act 228, an outline detection act 230, a stack size estimation act 232, a layer identification act 234, and a cylindrical projection act 236, each as set forth more fully below.

In the background subtraction act 228, the image sensor 150 may capture background images directed onto the image sensor 150 by the mirror arrangement when no gaming tokens are present on the bet placement surface 122. The processor 110 may identify elements in the background images taken when no gaming tokens are present on the bet placement surface 122 as background elements. The processor 110 may then remove the background elements from the pericentric images of the lateral side surface 124 of the stack of gaming tokens 146 captured by the image sensor 150, wherein the processor 110 outputs a background-subtracted image depicting substantially only the lateral side surface 124 of the stack of gaming tokens 146 to a frame buffer in the processor memory for further processing. The background images may be captured randomly by the image sensor 150 or at a predetermined schedule, such as when the bet sensor 100 is turned on. In some embodiments, the background images may be captured between successive bet placements. The background-subtracted image may be further processed to form a thresholded image for use in subsequent acts of the preprocessing stage 224.

In the outline detection act 230, the processor 110 may identify the effective center, or "ideal center," $C_0$ of the pericentric view of the stack of gaming tokens 124 depicted in the thresholded. In some embodiments, the processor 110 may identify the ideal center $C_0$ of the pericentric view of the stack of gaming tokens 124 as coincident with the Z-axis of the mirror arrangement.

Figure 23:
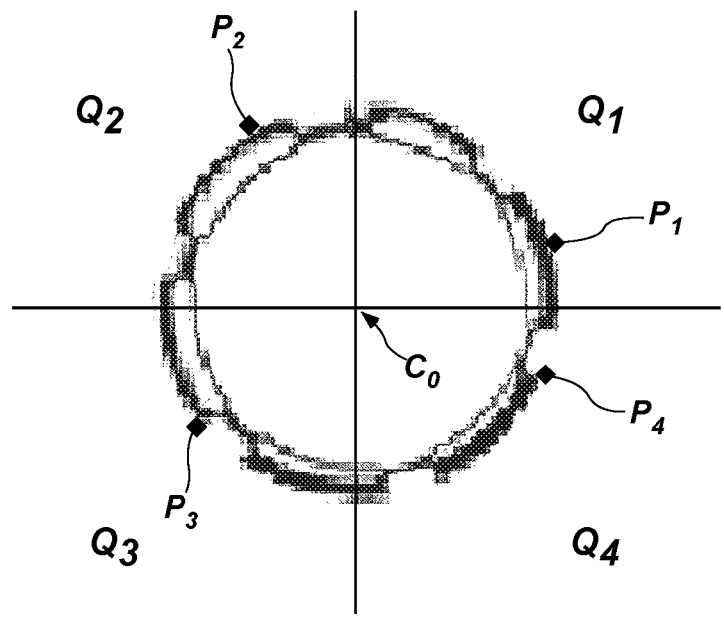
FIG. 23 illustrates a plan view of a two-dimensional image of the three-dimensional lateral side surface of a stack of gaming tokens utilized in the preprocessing stage of FIG. 22.
Figure 24:
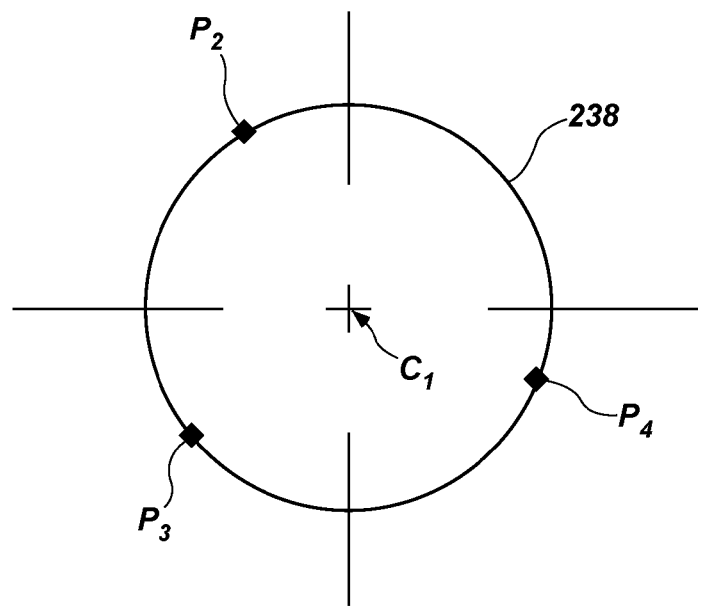
FIG. 24 illustrates a calculated circle associated with an inner layer of the stack of gaming tokens in the image of FIG. 23.

Referring now to FIG. 23, a thresholded image of the lateral side surface 146 of a stack of gaming tokens 124 is shown narrowed to a region of interest containing substantially only the lateral side surface 146 of the stack of gaming tokens 124. A circular outline of the pericentric lateral side surface 146 of the stack of gaming tokens 124 is extrapolated by identifying radially-outermost, non-zero points in the thresholded image measured from the ideal center $C_0$ of the stack of gaming tokens 124. By way of non-liming example, the region of interest may be divided into four (4) quadrants, with the first quadrant $Q_1$ extending from 0 degrees to 90 degrees, the second quadrant $Q_2$ extending from 90 degrees to 180 degrees, the third quadrant $Q_3$ extending from 180 degrees to 270 degrees, and the fourth quadrant $Q_4$ extending from 270 degrees to 360 degrees (0 degrees). The processor 110 may identify, in each of the four quadrants $Q_1$-$Q_4$, a radially-outermost non-zero point $P_1$, $P_2$, $P_3$, $P_4$. After these points $P_1$, $P_2$, $P_3$, $P_4$ are identified, the processor 110 may then select the radially-outermost non-zero point of three (3) of the four (4) quadrants to perform a circle fit function to form a circle representing a circular outline 238 of the pericentric view of the stack of gaming tokens 146 in the thresholded image. The processor 110 may optionally select the three radially-outward-most non-zero points with the greatest angular distance therebetween to perform the circle fit function. As shown in FIG. 23, the three radially-outward-most non-zero points with the greatest angular distance therebetween are $P_2$, $P_3$ and $P_4$. After these three (3) points $P_2$, $P_3$, $P_4$ are selected, as shown in FIG. 24, the processor 110 may perform the circle fit function by forming a circle intersecting each of the three (3) selected points $P_2$, $P_3$, $P_4$, which circle represents the circular outline 238 of the stack of gaming tokens 146 depicted in the pericentric, thresholded image previously described. The processor 110 may also identify and log the center $C_1$ of the circular outline 238.

Figure 25:
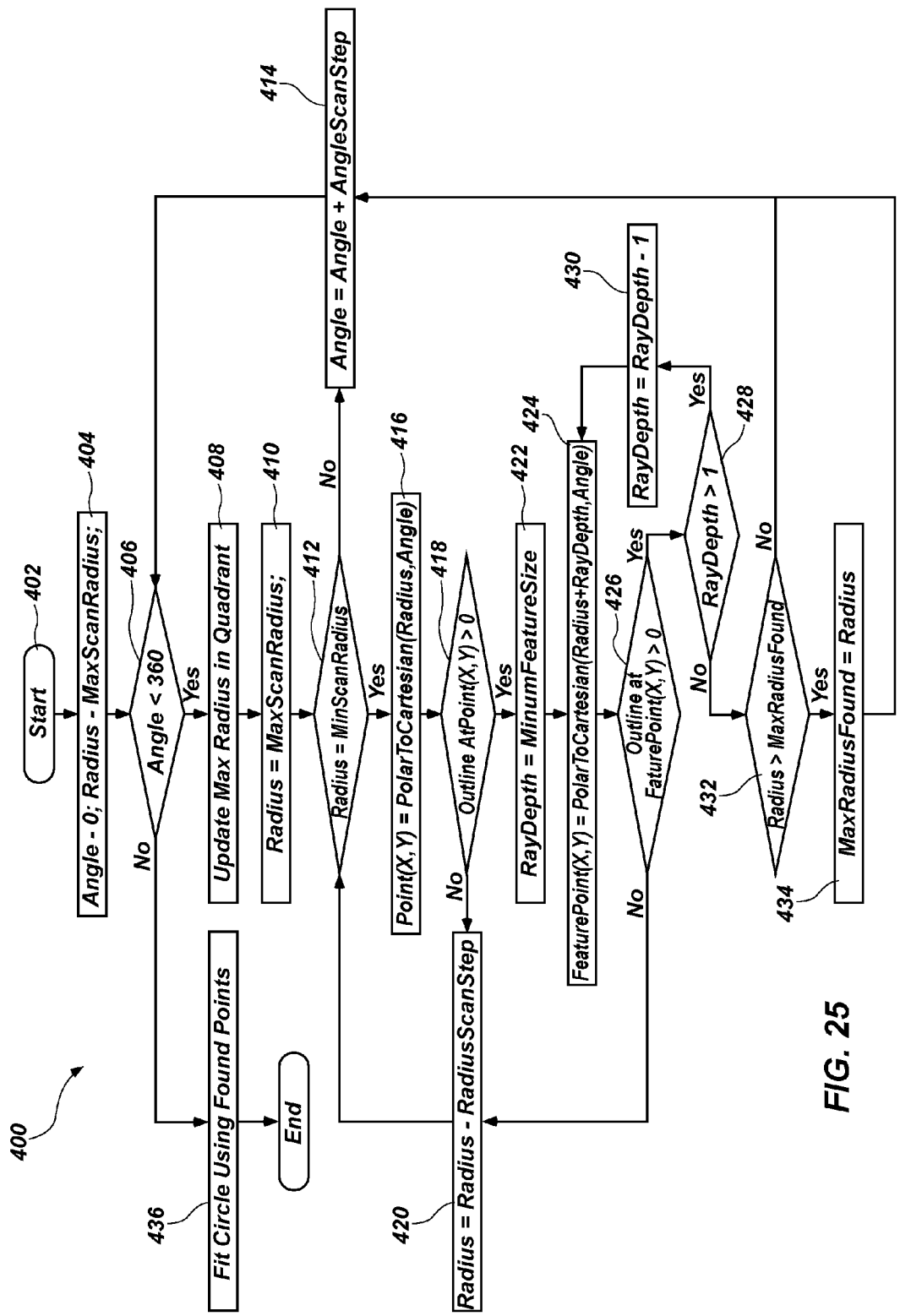
FIG. 25 illustrates a diagram of an algorithm for determining an outline of a stack of gaming tokens in a two-dimensional, pericentric view of the stack, according to an embodiment of the present disclosure.

FIG. 25 illustrates a non-limiting example of an algorithm 400 for identifying radially-outermost points in each quadrant, according to an embodiment of the present disclosure. In the algorithm 400, the processor 100 may proceed to scan, at a start angle (in the present example, the start angle is 0 degrees), radially inward, along a radial line intersecting the ideal center $C_0$ of pericentric, thresholded image, from a maximum scan radius (i.e., "MaxScanRadius") to a minimum scan radius (i.e., "MinScanRadius") to identify non-zero points along this line. Once the processor 110 has completed its scan at the start angle, the processor may repeat the scan at a second angle, wherein the second angle is greater than the start angle by an incremental angle (i.e., "AngleScanStep"). The processor 110 may repeat the process until it has repeated the scans at angles from 0 degrees to 360 degrees of the thresholded image.

At the start 402 of the algorithm 400, the start angle may be set at 0 degrees and the processor 110 may begin scanning at act 404 at the MaxScanRadius radially inward to the MinScanRadius. The MaxScanRadius and the MinScanRadius may be predetermined by the processor 110. At act 406, the processor 110 may identify the angle at which it is performing the scan. If the angle is less than 360 degrees (i.e., the entire 360-degree region of the image has not been scanned), the processor 110 may proceed to act 408, wherein the processor 110 may update the maximum radius identified at any of the previously scanned angles prior to continuing to scan from the MaxScanRadius radially inward to the MinScanRadius at the present angle. If, during this scan, the processor 110 identifies a non-zero point (i.e., a pixel) in the thresholded image, the processor 110 may determine, at act 412, whether the non-zero point is located at a radius greater than the MinScanRadius. If the non-zero point is not located at a radius greater than the MinScanRadius, or if no non-zero point is located between the MaxScanRadius and the MinScanRadius, the processor 110 may proceed to act 414, wherein the processor 110 may perform the scan at the next angle increased in the amount of the AngleScanStep. However, if a non-zero point is located during act 412 between the MaxScanRadius and the MinScanRadius, the processor may proceed to act 416, wherein the processor 110 may log the location of the non-zero point as a Cartesian coordinate (x, y).

After logging the non-zero point, the processor 110 may determine whether the non-zero point represents a feature of the thresholded image or mere noise present in the image. To make such a determination, the processor may determine, at act 418, whether a pixel is present at the logged coordinate (x, y). If no pixel is present at the logged coordinate (x,y), the processor 110 may continue scanning radially inward to the MinScanRadius, as shown at act 420. However, if a pixel is present, the processor 110 may then explore the depth of the feature identified at the non-zero point at coordinate (x, y). At act 422, the processor 110 may recall a predetermined ray depth (i.e., "RayDepth"), measured from the logged coordinate (x, y), representing a minimum feature size (i.e., "MinumFeatureSize") necessary for the processor 110 to identify the feature as a portion of the stack in the thresholded image instead of mere noise present in the image. By way of non-limiting example, the RayDepth may have a width of four (4) pixels. The processor 110 may initiate a decrementing process through which the depth of the feature is iteratively measured to determine whether the depth is greater than the MinFeatureSize. At act 424, the processor 110 may identify a feature point (i.e., "FeaturePoint") located a distance of RayDepth from the logged coordinate (x, y). At act 426, the processor 110 may determine whether a pixel is present at the FeaturePoint. If a pixel is not present at the FeaturePoint, the processor 110 may continue scanning from the non-zero point radially inward to the MinScanRadius, as shown at act 420. However, if a pixel is present at the FeaturePoint, the processor 110 may identify whether the RayDepth has a size greater than 1 pixel at act 428. If the RayDepth is greater than one (1) pixel, the processor 110 may reduce the size of the RayDepth by one (1) pixel at act 430 and repeat acts 424 and 426 with the reduced RayDepth. Acts 424, 426, 428 and 430 may be repeated until the RayDepth is decremented to zero. The number of iterations through acts 424, 426, 428 and 430 allows the processor 110 to apprise the depth of the non-zero point to determine whether the non-zero point represents image noise or a portion of the stack in the thresholded image. The iterative process of acts 424, 426, 428 and 430 may end if, at act 428, the processor 110 identifies the size of the iteratively decremented RayDepth as being equal to or less than one (1) pixel. It is to be appreciated that if acts 424, 426, 428 and 430 are repeated until the processor 110 identifies the size of the RayDepth as being equal to or less than one (1) pixel at act 428, the depth of the non-zero point will have been determined by the processor 110 to have been greater than the MinimumFeatureSize, and thus determined to be a portion of the stack depicted in the thresholded image instead of mere noise present in the image.

If, at act 428, the processor 110 identifies the size of the RayDepth as being equal to or less than one (1) pixel, the processor 110 may then determine, at act 432, whether the radius at the non-zero point is greater than the maximum radius found (i.e., "MaxRadiusFound") at any of the preceding angles scanned within the present quadrant. If the radius at the non-zero point is not greater than the MaxRadiusFound within the present quadrant, the processor 110 may proceed to act 414 to perform the scan at the next angle increased by the AngleScanStep. However, if the radius at the non-zero point is greater than the MaxRadiusFound within the present quadrant, the processor 110 logs, at act 434, the radius at the non-zero point as the MaxRadiusFound within the present quadrant prior to proceeding to act 414 to perform the scan at the next angle increased by the AngleScanStep. After increasing the angle by the AngleScanStep, the processor 110 proceeds to act 406 to determine whether the present angle is less than 360 degrees, and if so, proceeds to acts 408 and beyond at the present angle. The process is repeated until the processor 110 has logged the radially-outermost points in each of the quadrants and, at act 408, determines that the present angle is equal to or greater than 360 degrees, at which point the processor 110 proceeds to act 436, wherein the processor 110 performs the circle fit function with the three radially-outermost points that have the greatest angular distance therebetween, as previously described. Once the circle fit function has produced the circular outline 238 of the pericentric view of the stack of gaming tokens 124 in the thresholded image, the processor identifies the center $C_1$ of the circular outline 238.

After the processor 110 has identified the circular outline 238 and the center $C_1$ thereof for the pericentric view of the stack of gaming tokens 124 in the thresholded image, the processor 110 may perform the stack size estimation act 232, wherein the processor 110 may correlate the radius of the circular outline 238 with the radii of similar outlines of known stack sizes with variable amounts of tokens therein. For example, radii of outlines of stacks of gaming tokens with as few as one token therein and as many as fifteen (15) or more tokens therein may be stored in processor memory. The processor 110 may recall these radii when performing the stack size estimation act 232 and when estimating the number of tokens in the stack 124.

Figure 26:
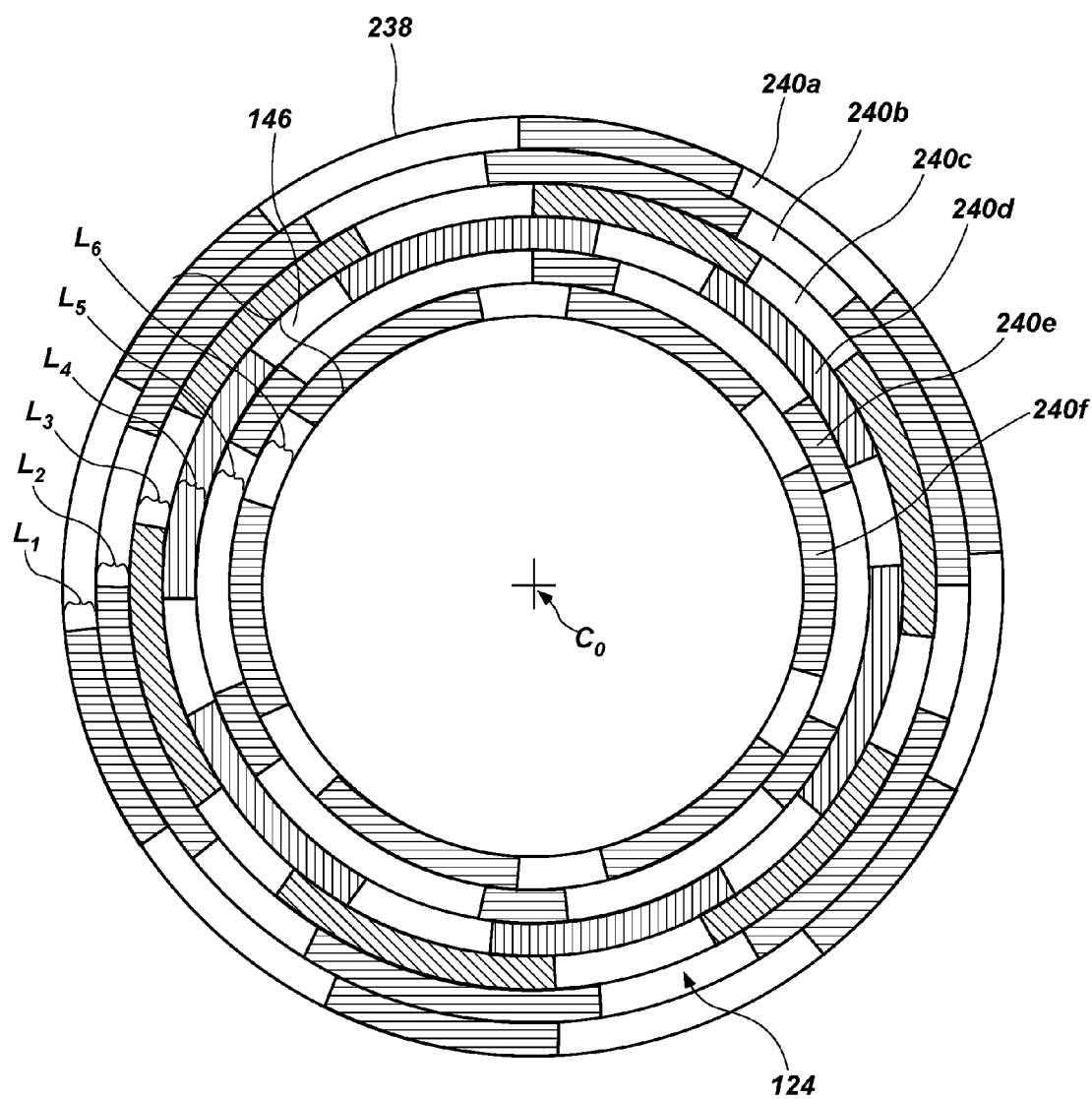
FIG. 26 illustrates a plan view of a two-dimensional image of the three-dimensional lateral side surface of a stack of gaming tokens supported on the bet sensor, wherein the two-dimensional image depicts inner layers of the stack of gaming tokens.

After the stack size estimation act 232 has been completed, the processor 110 may perform the layer identification act 234. Referring now to FIG. 26, a two-dimensional, pericentric, background-subtracted image of the lateral side surface 146 of the stack of gaming tokens 124 is depicted. It is to be appreciated that, in the two-dimensional, pericentric, background-subtracted image of the stack, the circular outline 238 of the stack represents, in three-dimensional space, an upper edge of the lateral side surface of the topmost gaming token in the stack. Furthermore, a radially outermost edge of a token in the stack, in the two-dimensional, pericentric image of FIG. 26, represents an upper edge of the token in three-dimensional space. Similarly, a radially innermost edge of a token in the stack depicted in FIG. 26 represents a lower edge of the token in three-dimensional space. During the layer identification act 234, the processor 110 may identify the outlines of the lateral side surfaces of each gaming token in the stack by performing an edge detection algorithm and correlating the detected edges with the previously estimated number of gaming tokens in the stack and the expected circle radius of the outermost and innermost edges of each token therein. The edge detection algorithm may include, by way of non-limiting example, a "difference of Gaussians" method, wherein the image, with the background subtracted, is converted to grayscale and a first blurred version of the image is subtracted from a second, less blurred version of the image. In this example, to acquire the first blurred version of the image, the grayscale image may be convolved with a first Gaussian kernel (3×3) having a first standard deviation. To acquire the second, less blurred version of the image, the grayscale image may be convolved with a second Gaussian kernel (7×7) having a standard deviation less than the standard deviation of the first Gaussian kernel. Subtracting the first blurred image from the second, less blurred image preserves spatial information lying between the range of frequencies preserved in the first and second blurred images, revealing edges or outlines present in the original image, as shown in the edge detection image of FIG. 26. As shown in FIG. 26, the edges present in the edge detection image may not be complete circles, but may be circular fragments.

After edge detection is performed, the processor 110 may correlate the estimated stack size, the estimated number of gaming tokens in the stack, the expected circle radii for each token therein, and the edges detected during the edge detection act to identify the radial inner and outer boundaries of each token in the stack 124. The radial area between the radially-outermost and -innermost boundaries of each token in the stack 124 may be termed a "layer" of the stack 124, wherein each layer represents the lateral side surface of the associated token. The processor 110 may identify boundaries of the layers of the stack working radially inwardly from the circular outline 238 to a radially-innermost boundary of the bottom token in the stack 124. Thus, the topmost token in the stack may be termed the "first token" 240a, the token in the second-from-the-top position in the stack may be termed the "second token" 240b, the token in the third-from-the-top position may be termed the "third token" 240c, and the underlying tokens may respectively be termed the "fourth token" 240d, the "fifth token" 240e and the "sixth token" 240f, respectively, with the sixth token 240f being the bottommost token in the stack 146 depicted in FIG. 26.

Similarly, the lateral side surface of the first token 240a may be termed a "first layer" $L_1$, the circumference of the lateral side surface of the second token 240b may be termed a "second layer" $L_2$, the circumference of the lateral side surface of the third token 240c may be termed a "third layer" $L_3$, the circumference of the lateral side surface of the fourth token 240d may be termed a "fourth layer" $L_4$, the circumference of the lateral side surface of the fifth token 240e may be termed a "fifth layer" $L_5$, and the circumference of the lateral side surface of the sixth token 240f may be termed a "sixth layer" $L_6$ of the stack 124.

As shown in FIG. 26, the radially innermost edge of a token and a radially outermost edge of the underlying token may together be depicted as a single edge (i.e., "boundary") between the adjacent tokens (i.e., "layers"). However, in other embodiments where tokens in the stack are misaligned (not shown), the radially innermost edge of a token may not coincide with a radially outermost edge of the underlying token. It is to be appreciated that the embodiments disclosed herein are capable of accommodating a degree of misalignment of the tokens in the stack 124.

The processor 110 may determine the location of the boundaries of the layers $L_1$-$L_6$ by correlating the edges depicted in the edge detection image, the previously-estimated number of tokens in the stack and expected circle radius for each token therein, and subsequently using the correlated data to perform three-point circle fit functions on non-zero points within annular bands in the edge detection image corresponding to the expected circle radii previously determined by the processor 110. The resulting circles formed by these circle fit functions may correspond to the boundaries of each of the layers $L_1$-$L_6$ in the stack 124.

Figure 27:
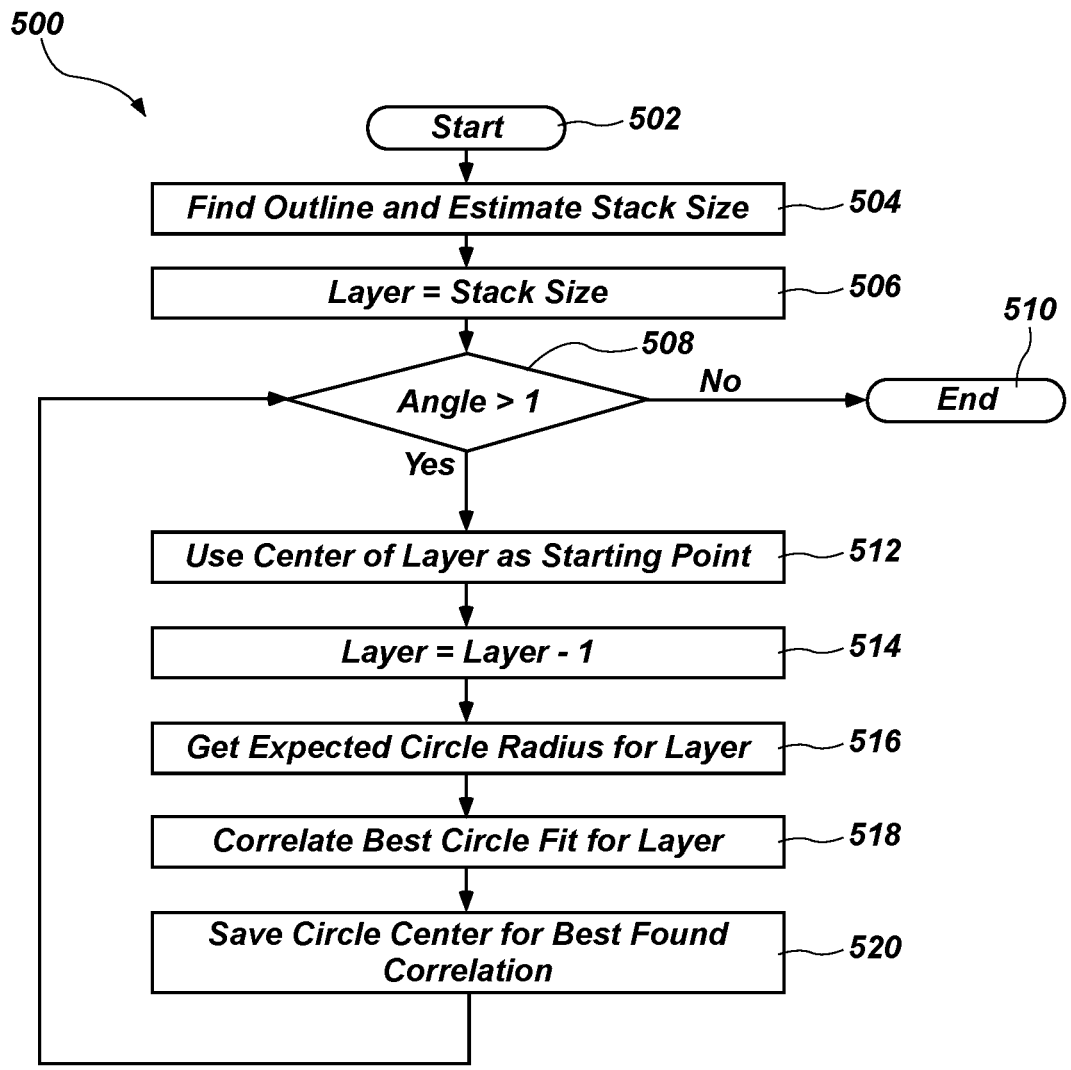
FIG. 27 illustrates a diagram of an algorithm for identifying inner layers of a stack of gaming tokens depicted in the two-dimensional, pericentric image of FIG. 26, according to an embodiment of the present disclosure.
Figure 28:
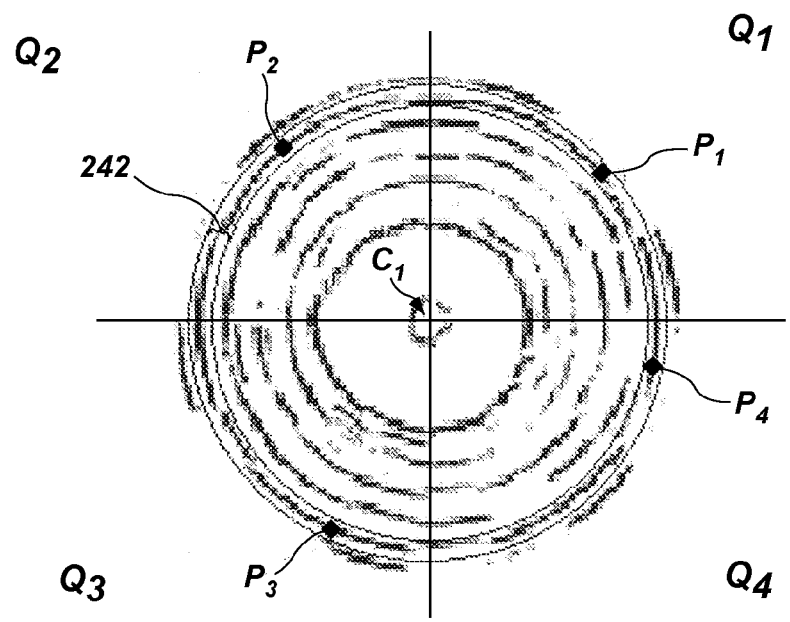
FIG. 28 illustrates an edge detection image of the two-dimensional image of FIG. 26 showing layer boundaries within the stack of gaming tokens.
Figure 29:
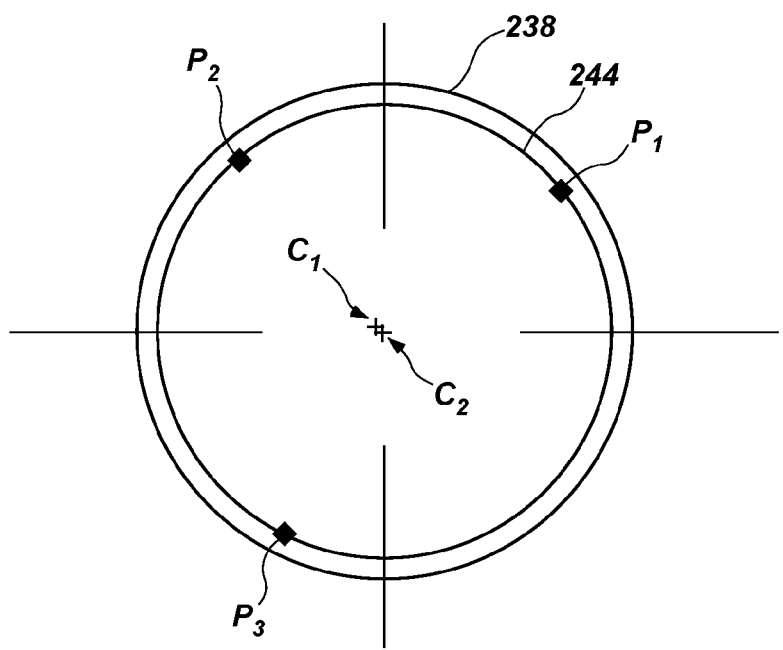
FIG. 29 illustrates a calculated circle associated with an inner layer of the stack of gaming tokens in the image of FIG. 28.

FIGS. 27 through 29 illustrate a non-limiting example of a method for identifying boundaries of the inner layers $L_1$-$L_6$ of the stack 124. FIG. 27 illustrates a non-limiting example of an algorithm 500 for identifying inner layer boundaries. FIG. 28 illustrates an edge detection image of the stack of gaming tokens shown in FIG. 26 on which the algorithm 500 of FIG. 27 is performed. FIG. 29 illustrates a circle produced by the fit function of the algorithm 500 of FIG. 27, wherein the circle represents a radially inner boundary of the first layer $L_1$.

Referring to FIG. 27, after commencement of the inner boundary detection algorithm 500 at act 502, the processor 110 may proceed to act 504 to find the outline of the pericentric view of the stack 124 in the thresholded image, as previously described with respect to the algorithm 400 of FIG. 25, and utilize the radius of the circular outline 238 to estimate the size of the stack 124 and the number of tokens in the stack 124. At act 506, the processor 110 equivocates the present layer analyzed with the stack size, i.e., the circular outline 238 previously derived. At act 508, the processor 110 utilizes the estimated stack size and estimated number of tokens in the stack 124 to determine whether the present layer represents a quantity of tokens in the stack greater than one (1). If the processor 110 determines that the present layer represents a position from the bottom of the stack 124 equal to or less than one (1), the processor 110 determines that the boundaries of each of the layers have been identified and terminates the algorithm at act 510. However, if the processor 110 determines that the present layer represents a position from the bottom of the stack 124 greater than one (1), for example, if the present layer represents the topmost token in the stack 124, the processor proceeds to act 512, wherein the processor 110 recalls the location of the center $C_1$ of the circular outline 238 and uses the center $C_1$ as a starting point to determine, at act 514, the boundaries of the immediately underlying layer, which become the present layer analyzed.

At act 516, the processor 110 may utilize the estimated stack size and the estimated number of tokens in the stack to recall an expected circle radius for the present layer. At act 518, the processor 110 may utilize image data in the edge detection image within an annular band surrounding the expected circle radius to identify non-zero points to utilize to perform a circle fit function. After the circle fit function is complete to identify a circle representing a boundary of the present layer, the processor 110 may identify and log a center of the circle at act 520 for use in act 512 on the following iteration. After act 520, the processor may return to act 508 and repeat the process for the underlying layers until the present layer represents a position from the bottom of the stack equal to or less than one (1). In this manner, the processor 110 analyzes and identifies the layers $L_1$-$L_6$ working radially inward from the outer boundary 238 of the outer token 240a in the pericentric image.

Referring now to FIGS. 28 and 29, a visual representation of an embodiment of the algorithm 500 of FIG. 27 is illustrated. For example, to determine the bounds of the first layer $L_1$, after previously determining the circular outline 238 and the center $C_1$ thereof, the processor 110 may identify, in the edge detection image, non-zero points $P_1$, $P_2$, $P_3$, $P_4$ within four (4) quadrants $Q_1$-$Q_4$ and within an annular band 242 corresponding to the expected circle radius for the radially-innermost edge of the first token 240a, wherein the expected circle radius is measured from the center $C_1$ of the circular outline 238. The processor 110 may adjust the radial width of the annular band 242 as necessary to accommodate varying degrees of token misalignment in the stack 124. As shown in FIG. 29, the processor 110 may then use the three non-zero points with the greatest angular distance therebetween $P_1$, $P_2$, $P_3$ to perform a circle fit function to form a circular outline 244 representing the inner boundary of the first layer $L_1$, wherein the circular outline 238 of the stack 124 and the circular outline 244 of the radially-innermost edge of the first token 240a together mark the boundaries of the first layer $L_1$. The processor 110 may also log the center $C_2$ of the circular outline 244 of the inner edge of the first token 240a for use with locating the expected circle radius of the next inner boundary. The successive boundaries of the inner layers $L_2$-$L_6$ and their corresponding centers may be determined in a similar manner. It is to be appreciated that the center of each boundary may be logged and used by the processor 110, in connection with the expected circle size for each layer, to determine the annular band within which to identify non-zero points and perform a circle fit function for the succeeding inner boundary. The process may be repeated until the boundaries of each layer are identified.

Figure 30:
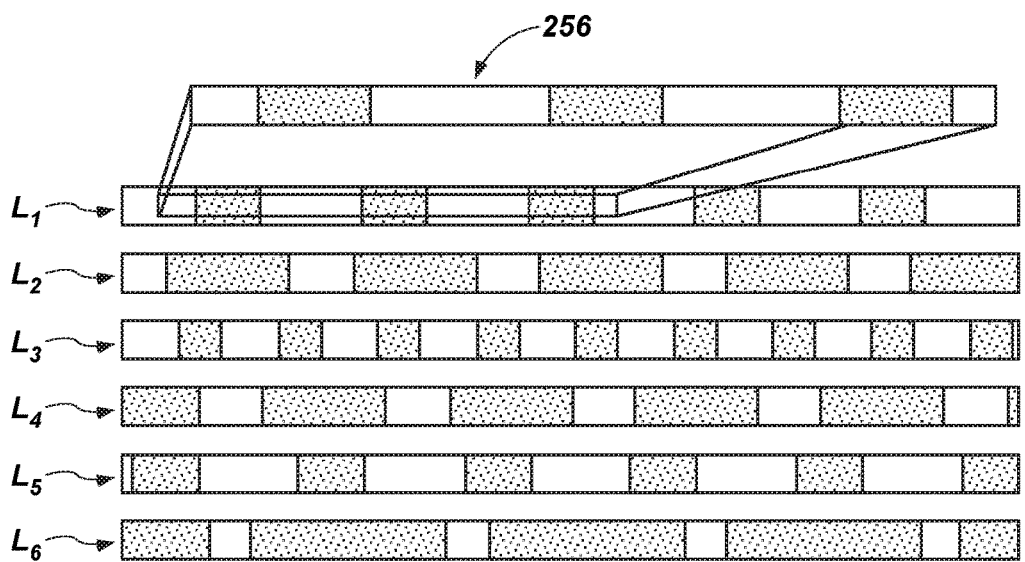
FIG. 30 illustrates linear layers of a cylindrical projection of the two-dimensional image of the stack of gaming tokens of FIG. 26.

Referring now to FIG. 30, after the centers and boundaries of the layers $L_1$-$L_6$ are determined for the tokens in the pericentric image of the lateral side surface 146 of the stack of gaming tokens 124, the processor 110 may perform the cylindrical projection act 236 to convert the layers $L_1$-$L_6$ from a pericentric orientation to a linear orientation of a cylindrical projection, as previously described herein. Because the centers for each of the tokens, such as centers $C_1$ and $C_2$ shown in FIG. 29, may not by aligned, the processor 110 may convert each layer from a pericentric orientation into a linear orientation separately. The cylindrical projection act 236 may complete the preprocessing stage 224 of the token pattern detection algorithm 220.

Figure 31:
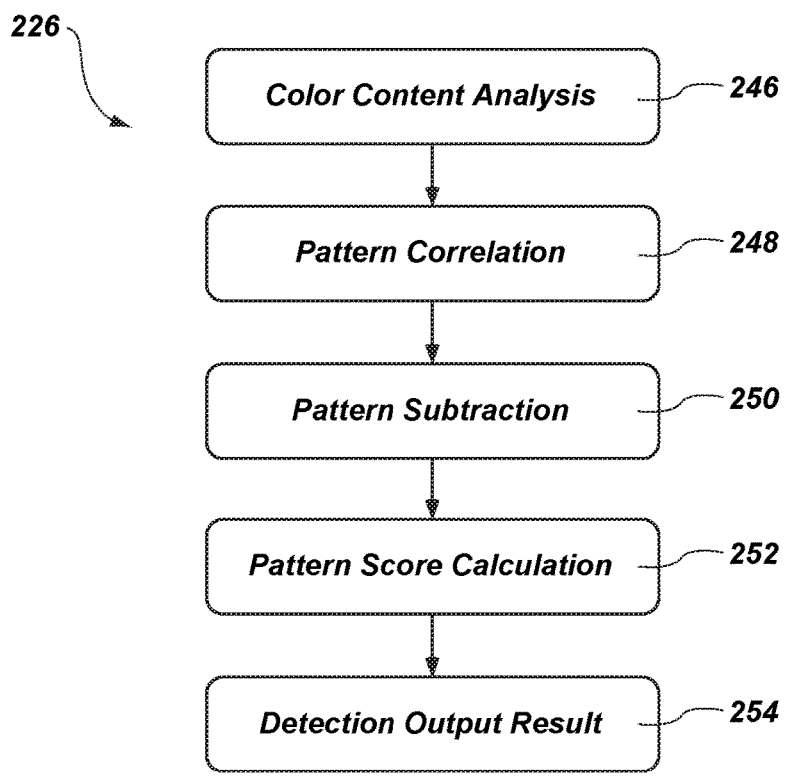
FIG. 31 illustrates a diagram of a detection stage of the token pattern detection algorithm of FIG. 21.

Referring now to FIG. 31, an algorithm of the detection stage 226 is shown. In the detection stage 226, the processor 110 may perform a color content analysis 246, a pattern correlation act 248, a pattern subtraction act 250, a pattern score calculation 252, and a detection output result act 254 on each layer $L_1$-$L_6$ in the linear projection image, as set forth more fully below.

In the color content analysis act 246, color content histograms may be derived for each layer previously linearly projected. For example, at least one line having a plurality of reference points may be projected horizontally through each liner layer. The processor 110 may then perform an algorithm to identify the color intensity at each reference point on each line extending horizontally through each layer for each of the red, green and blue colors on a red, green, blue (RGB) color scale. After the processor 110 has identified the color intensity for each color on the RGB scale at each reference point on the line, a reference graph, such as a histogram, may be plotted and stored in the processor memory charting the color intensity for each color on the RGB scale at each reference point on the line. The processor 110 may compare the histogram for each layer to histograms of template match candidates stored in memory to preselect a limited amount of template match candidates to which each linear layer will be compared in the pattern correlation act 248.

In the pattern correlation act 248, the processor 110 may compare patterns within each linear layer to patterns of the template match candidates identified by the processor 110 in the color content analysis act 246. The processor 110 may select a limited region, or "patch" 256, of each layer, as shown in FIG. 30, for further correlation with the template match candidates preselected by the processor 110. The layer patch 256 may have a horizontal length equivalent to an arc length of the lateral side surface of the token subtending an angle between about 100 degrees and about 260 degrees in three-dimensional space. In other embodiments, the layer patch 256 may have a horizontal length equivalent to an arc length of the lateral side surface of the token subtending an angle between about 120 degrees and about 220 degrees in three-dimensional space. In further embodiments, the layer patch 256 may have a horizontal length equivalent to an arc length of the lateral side surface of the token subtending an angle between about 140 degrees and about 180 degrees in three-dimensional space. In yet additional embodiments, the layer patch 256 may have a horizontal length equivalent to an arc length of the lateral side surface of the token subtending an angle of about 160 degrees in three-dimensional space from a center of the token. It is to be appreciated that the size of the layer patch 256 may depend on patterns in the linear layer and may be predetermined for particular token types and sizes. After the layer patch 256 is defined, the processor 110 may compare the patterns within the layer patch 256 to patterns within each of the template match candidates preselected during the color content analysis 246 to determine the relative positions of the layer patch 256 and each template match candidate at which the layer patch 256 correlates most closely with the patterns in the template match candidate. The position of closest correlation may be determined using a template matching function. By way of non-limiting example, the template matching function may effectively slide the layer patch 256 over an image of each template match candidate pixel by pixel and compare the overlapping layer patch 256 and template match candidate using a normalized squared difference function, such as the following function, $$R(x, y) = \frac{\sum_{x', y'} (T(x', y') - I(x + x', y + y'))^2}{\sqrt{\sum_{x', y'} T(x', y')^2 \cdot \sum_{x', y'} I(x + x', y + y')^2}},$$

to compile a result matrix R indicating how closely the layer patch 256 "matches" the template match candidate at each (x, y) coordinate of the template match candidate. In this normalized squared difference function, R represents the result, T represents the layer patch 256, I represents the pattern match candidate, x and y represent Cartesian coordinates of the template match candidate, and x' and y' are variables associated with the width and height of the layer patch 256, as defined in The OpenCV Reference Manual at pp. 337-38 (Release 2.4.9.0, Apr. 21, 2014), the entire disclosure of which is incorporated herein by this reference, available on:

the world wide web at docs.opencv.org/modules/imgproc/doc/object_detection.html?highlight=matchtemplate#matchtemplate (last referenced Sep. 18, 2014). Lower result values R returned from the normalized squared difference function indicate better matches between the layer patch 256 and the template match candidate. The result matrix R from the normalized squared difference function allows the processor 110 to identify the location within each template match candidate at which the layer patch 256 most closely matches the template match candidate and to calculate an associated pattern correlation value, or score, for each template match candidate. The processor 110 may effectively freeze the layer patch 256 at the location of the template match candidate with the lowest pattern correlation value (highest degree of correlation) determined by the normalized squared difference function. The processor 110 may define a template patch (not shown) coextensive with the layer patch 256 at the location of the highest correlation therebetween as determined by the normalized squared difference function.

Then, in the pattern subtraction act 250, the processor 110 may subtract the layer patch 256 from the template patch and threshold an image of the template patch. The processor 110 may then compare the pixels of the layer patch 256 with the pixels of the thresholded template patch. The processor 110 may determine a pixel correlation value by counting the amount of pixels in the layer patch 256 exciding the threshold of the template patch to determine a number of pixels in the layer patch 256 that are different from those of the template patch, wherein a pixel correlation score of 0 indicates a perfect match between the layer patch 256 and the template patch.

In the pattern score calculation act 252, the processor 110 may utilize both the pattern correlation value and the pixel correlation value to calculate a final correlation score between the layer patch 256 and each of the template match candidates. A user may set a predetermined threshold score below which the final correlation score must rate to be considered a "pattern match." If the final correlation score is below the threshold score, the processor 110 may indicate a "pattern match" status for the template match candidate. If the final correlation score is above the threshold value, the processor 110 may indicate only the presence of a token in the analyzed layer. The processor 110 may calculate and log the final correlation scores for each of the template match candidates preselected during the color content analysis act 246. In the detection output result act 254, the processor 110 may assign the template match candidate with pattern match status having the most favorable final correlation score a "final match" status. The processor 110 may then assign the layer a wager value associated with the template match candidate having a final match status. The acts of the detection stage 226 may be repeated for each layer in the linear projections of the lateral side surfaces of the stack of gaming tokens. The processor 110 may add the wager values for each layer to calculate the sum wager value for the stack of gaming tokens 124.

It is to be appreciated that the template match candidates stored in processor memory may include template match candidates derived from images of tokens not centered on the bet placement surface 122. In this manner, if one of the linear layers of the stack 124 is associated with a misaligned token, the processor 110 may have template match candidates of misaligned tokens from which to select when performing the color content analysis 246. Furthermore, to accommodate circumstances where the illumination saturation level of the lateral side surface of each token varies according to the vertical location of the token within the stack 124, the template match candidates may be derived from images of tokens located at various vertical locations within the stack 124 to provide template match candidates for each reference token at varying illumination saturation levels.

The processor 110 may possess the computing power to perform the necessary computations to determine the value of the stack of gaming tokens 124 in about ten (10) seconds or less. In some embodiments, the processor 110 may possess the computing power to perform the necessary computations to determine the value of the stack of gaming tokens 124 in about one (1) second or less. In further embodiments, the processor may possess the computing power to perform the necessary computations to determine the value of the stack of gaming tokens 124 in about 0.5 second or less. In yet further embodiments, the processor may possess the computing power to perform the necessary computations to determine the value of the stack of gaming tokens 124 in about 0.1 second or less. The processor 110 may be capable of supporting software development tools and providing ease of integration with the image sensor 106. For example, the processor 110 may be what is referred to in the art as an "ARM-based" processor, such as, by way of non-limiting example, an open multimedia applications platform (OMAP) processor produced by Texas Instruments of Dallas, Tex., a Sitara microprocessor produced by Texas Instruments, or a S3C6410 model mobile processor produced by Samsung of Seoul, Korea. However, it is to be appreciated that any processor or combination of processors capable of performing the token recognition functions described above is within the scope of the embodiments disclosed herein.

As previously described with reference to FIG. 1, the processor 110 may be in electronic communication with the display device 112 for displaying the wager value to a player and/or operator of a wagering game. The display device 112 may be a liquid crystal display (LCD), such as a 1-line by 8-character (1×8) LCD or a 2-line by 8-character (2×8) LCD, either of which may optionally include a backlight. Alternatively, the display device 112 may include LEDs, organic LEDs (OLEDs), AMOLEDs, thin-film transistors (TFTs), a graphic LCD, or any combination thereof. In yet other embodiments, the display device 112 may comprise transparent LCD digital signage. As used herein, the term "transparent LCD digital signage" means and refers to a device comprising an LCD display embedded within a transparent or semi-transparent material. For example, in such embodiments, the transparent cover 102, or a portion thereof, may be integrated with an LCD display to form the display device 112 having transparent LCD digital signage, wherein the LCD display is configured to project static images, dynamic images, or any combination thereof on a surface of the transparent cover 102 that is visible by a player. In other words, the display device 112 may comprise at least a portion of the transparent cover 102, wherein the at least a portion of the transparent cover 102 is configured to display information visible to the player. For example, such information may include the wager value of the stack of gaming tokens 124. In such embodiments, the transparent cover 102 may be transparent or semi-transparent to visible light. The display device 112 configured to include transparent LCD digital signage may be in electronic communication with the processor 110, as previously described, wherein the images displayed on the display device are controlled by the processor 110. By way of a non-limiting example, the display device 112 configured to include transparent LCD digital signage may be a STA1713 model transparent LCD digital signage, produced by LiteMax Electronics, Inc. of New Taipei, Taiwan. It is to be appreciated that any device for displaying the wager value to a player and/or operator of the game is within the scope of the embodiments disclosed herein.

The bet sensor 100 may also be capable of communicating other information to a player of the game. For example, in addition to illuminating the stack of gaming tokens 124, the LEDs 107 may also be utilized as an indicator light system to communicate information to a player and/or operator of the game responsive to a state of the game. For example, a casino may wish to limit the duration during which a player may place a wager or indicate a player who has won a game. In some embodiments, the bet sensor 100, including the LEDs 107, the first reflective structure 130, and the transparent cover 102, may be configured to provide indicator light signals to a player of the game. In some embodiments, additional LEDs 107 of varying light color emissions may be used to, for example, signal an approached end of a period for wager placement, to indicate the end of such period, to indicate a winner of a round of a game, or all of the foregoing. In other embodiments, LEDs 107 may be strobed in different patterns to indicate one or more of the foregoing game-associated events. In any such embodiments, the bet sensor 100 may include at least one optical element that is configured to transmit visible light emitted by the LEDs 107 or another indicator light to a player and/or operator of the game.

Figure 16:
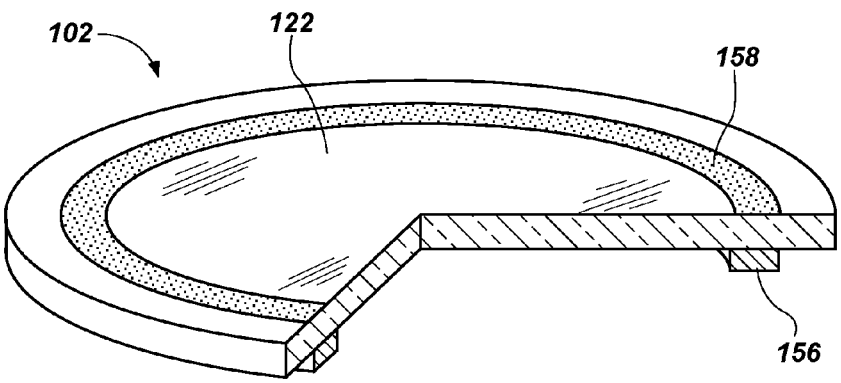
FIG. 16 illustrates a partially cut-away perspective view of a transparent cover that includes a feature configured to direct visible light signals to a player, and that may be employed in a bet sensor as described with reference to FIGS. 1 through 15.

For example, a light guide element 156 optionally may be located on an underside of the transparent cover 102, as illustrated in FIG. 16. The light guide element 156 may have an annular configuration and may be concentrically aligned with the hub structure 134. The light guide element 156 may comprise a portion of the transparent cover 102 or may comprise a separate structure affixed to the transparent cover 102. In embodiments in which the light guide element 156 is a separate structure attached to the transparent cover 102, the attachment of the light guide element 156 to the transparent cover 102 may be accomplished by a mechanical fastener, an adhesive, or other means of attachment. The light guide element 156 may be configured to channel light emitted from the LEDs 107 and transmit the channeled light in an even dispersion through a portion of the transparent cover 102 adjacent the light guide element 156. A portion of the top surface of the transparent cover 102 positioned above the light guide element 156 may comprise an optical surface element 158 configured to increase visibility of the light transmitted through the light guide element 156. The optical surface element 158 may comprise a textured or "frosted" diffuser portion of the top surface of the transparent cover 102 and may be configured to transmit an even dispersion of light in a ring configuration corresponding to the light guide element 156. The frosted diffuser portion of the optical surface element 158 of the transparent cover 102 may be formed by an etching process, including, by way of non-limiting example, a mechanical etching process, a chemical etching process, a laser etching process, a grinding process, or other processes known in the art. Thus, the processor 110 may control the LEDs 107 to emit light in cooperation with the light guide element 156, the transparent cover 102, and the optical surface element 158 to provide lighting effect signals for communicating information to a player. For example, when the bet sensor 100 is in a mode to attract players, the processor 110 may control the LEDs 107 to cause the optical surface element 156 to blink in a uniform manner. When the bet sensor 100 is in a mode to indicate a live betting, the processor 110 may control the LEDs 107 to cause the optical surface element 156 to transmit a solid ring of color. When the bet sensor 100 is in a payout mode, the processor 110 may control the LEDs 107 to cause the optical surface element 156 to transmit lights effectively running around the circumference of the optical surface element 156, also known as "chase lights." As noted above, the lighting signals may include emission of different colors of light to represent different signals. For example, a green light may indicate that a wager may be placed, while a red light may indicate that a wager may not be placed.

In embodiments in which the display device 112 comprises the transparent cover 102 configured with transparent LCD digital signage, the display device 112 may also be used as an indicator light system similar to that previously described. In such embodiments, the display device 112 may be controlled by the processor 110 to communicate information to a player responsive to a state of the game. In addition to displaying a wager value to a player, the display device 112 configured with transparent LCD digital signage may be configured to display, by way of non-limiting example, a dynamic countdown encouraging a player to place a wager within a predetermined time, an indication of the status of the game being played, a dynamic or static image indicating which game is being played, advertisements, or any other information a gaming institution wishes to communicate to a player.

Figure 17:
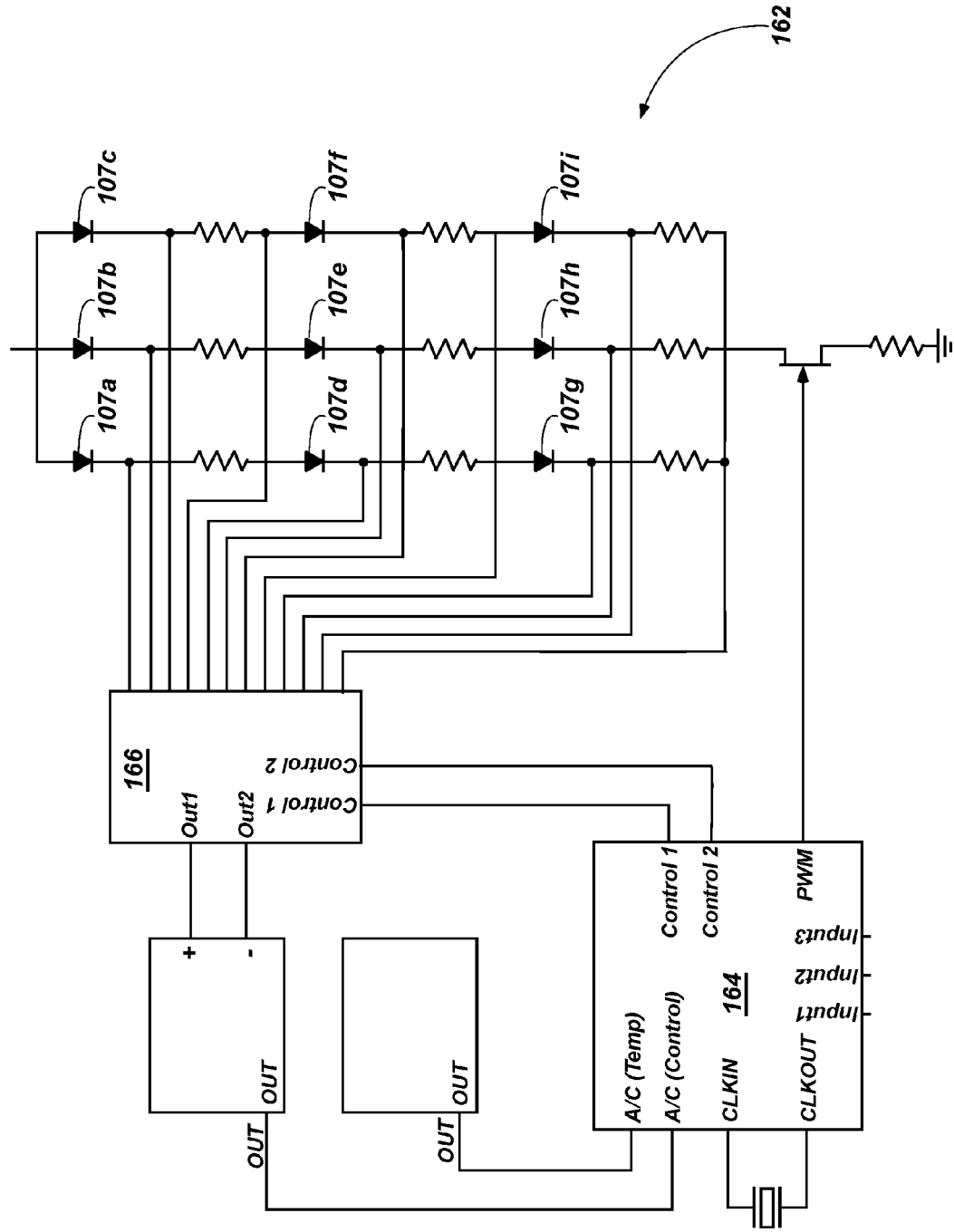
FIG. 17 illustrates a circuit diagram for a light-emitting diode (LED) driver that may be employed in a bet sensor as described with reference to FIGS. 1 through 16.

FIG. 17 illustrates a non-limiting example of a circuit that may be used in the LED driver 116 of FIG. 1. As shown in FIG. 1, the LED driver 116 may comprise a drive circuit 162 that may be used to allow the processor 110 to control the LEDs 107 for both illuminating the stack of gaming tokens 124 and for providing indicator lighting effects to a player. The drive circuit 162 may comprise a pulse-width modulation (PWM) multiplexed circuit including a microcontroller 164, such as what is referred to in the art as a "PIC" microcontroller, configured to transform a command signal from the processor 110 into a plurality of command signals. The plurality of command signals may include at least one unique command signal for each LED 107 of the plurality of LEDs. The drive circuit 162 is illustrated as having a set of nine (9) LEDs 107a-107i connected thereto; however, it is to be understood that any number of LEDs may be connected to the drive circuit 162, including each LED 107 of the illumination unit 120. A multiplexer 166 may be electronically interposed between the microcontroller 164 and each of the LEDs 107, and may direct each individual command signal from the microcontroller 164 to a specific LED 107. In this manner, the function of each LED 107 may be controlled by the processor, including color, intensity, fading, and strobe or pulse effects, to create a desired overall lighting effect for illuminating the stack of gaming tokens 124 or communicating information to a player.

As previously described with reference to FIG. 1, the processor 110 may be in electronic communication with a table controller 114. For example, a wire or cable may extend from the processor 110 (or the image sensor module 148) to the table controller 114, such as an ETHERNET® or USB cable. Alternatively, the table controller 114 may communicate wirelessly with the processor 110. The table controller 114 may be a PC-based computer platform with a display screen for displaying the wager value transmitted from the processor 110 to a table operator. The table controller 114 may include a user interface configured to allow the table operator to accept, reject, or correct the wager value. The table controller 114 may comprise an override function allowing the table operator to input a corrected wager value, wherein the corrected wager value may be transmitted from the table controller 114 to the processor 110 and subsequently displayed by the display device 112. The table controller 114 may also be configured to allow the table operator to communicate various signals to a player of the game through the indicator light system described above. For example, the table operator may select a signal command output from a list of signal command outputs stored in the table controller 114. The table controller 114 may subsequently transmit the signal command to the processor 110. The processor 110 may then transmit the signal command to the LED driver 116, wherein the LED driver 116 may process the signal command to control the LEDs 107, as previously described.

In some embodiments, the bet sensor 100 may comprise a modular configuration for ease of assembly. For example, as described above, the transparent cover 102, the first reflective structure 130, and the hub structure 134 may each be removably coupled together to provide simple assembly and disassembly of the illumination unit 120. Additionally, the optional lens 104 may be removably coupled to the image sensor 106. The image sensor 106 may be removably coupled with the processor 110, and the processor 110 may be removably coupled with the table controller 114. The removable attachment of these components may allow for ease of assembly and interchangeability of these components. Bet sensors 100 of the present invention may be connected in series to a processor as described in U.S. patent application Ser. No. 12/946,814, filed Nov. 5, 2010, now U.S. Pat. No. 9,142,084, issued Sep. 22, 2015, entitled "Wager Recognition System," the disclosure of which is incorporated herein in its entirety by this reference.

Figure 18:
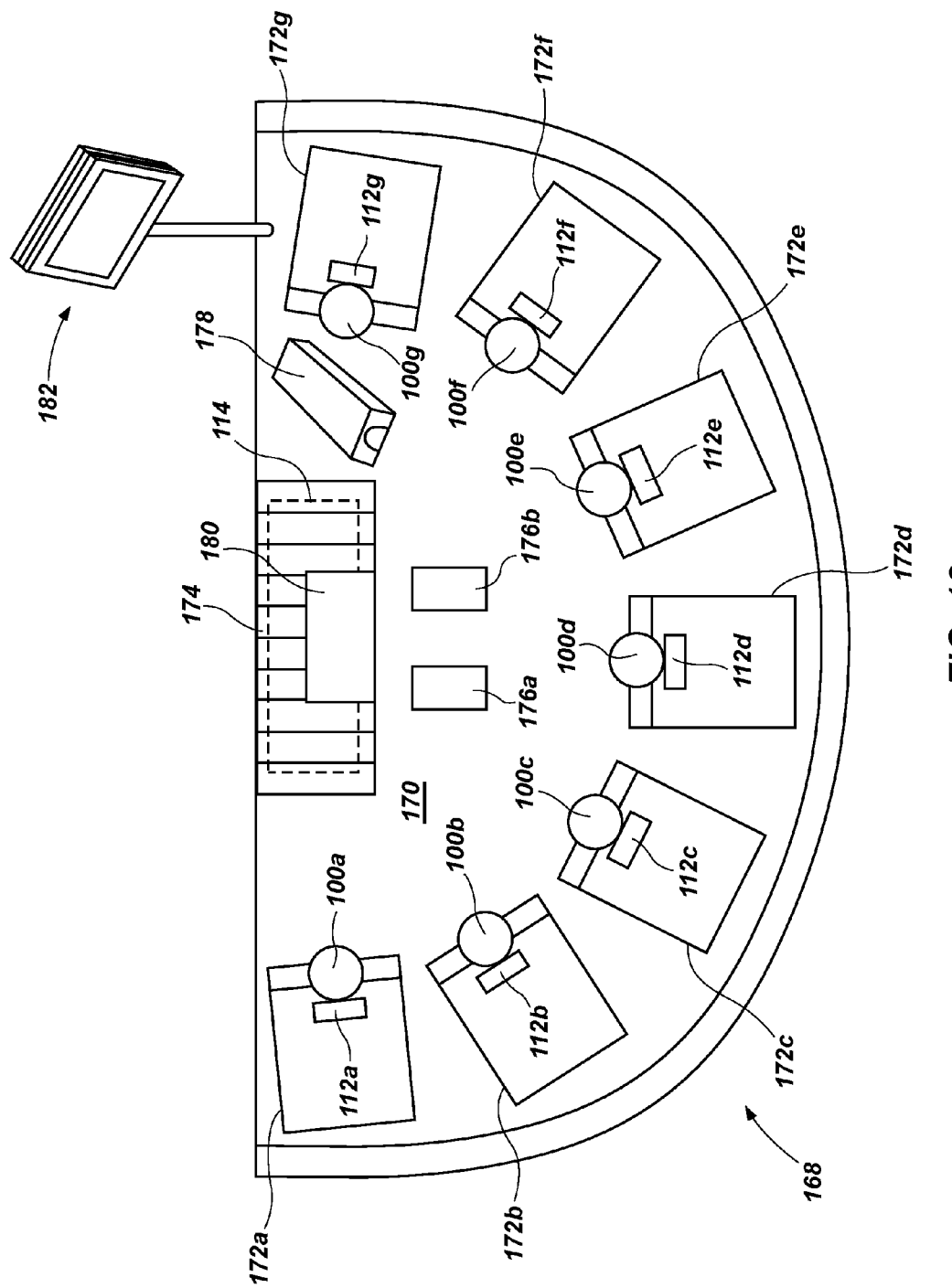
FIG. 18 illustrates a top plan view of an embodiment of a gaming table of the present disclosure, which includes a plurality of bet sensors as described with reference to FIGS. 1 through 17.

FIG. 18 illustrates an embodiment of a gaming table 168 of the present disclosure, which includes a table having an upper playing surface 170 and a plurality of apertures, each of which apertures extends through the upper surface of the table proximate each of a plurality of corresponding player positions 172a-172g at the table. The gaming table 168 further includes bet sensors 100 as described herein mounted to the table proximate, or, in some embodiments, within, the apertures extending through the upper surface of the table. For example, each bet sensor 100 may be mounted to the table 168 such that the transparent cover 102 is disposed in and covers the associated aperture. The upper betting surface 122 of the transparent cover 102 may be at least substantially flush with the upper playing surface 170 of the table 168.

A table controller 114 may be operatively coupled to the plurality of bet sensors 100. Each player position 172a-172g may include a bet sensor 100a-100g and a display device 112a-112g, each of which may be configured as previously described herein. The processor 110 (not shown in FIG. 18) of each bet sensor 100a-100g may be in electronic communication with the table controller 114, as previously described. The table 168 may further include additional features, such as a dealer chip tray 174, which may be used by the dealer to cash players in and out of the wagering game. For embodiments using physical cards 176a, 176b, the table 168 may further include a card handling device 178 that may be configured to shuffle, read, and deliver physical cards for the dealer and players to use during game play or, alternatively, a card shoe configured to read and deliver cards that have already been randomized. For embodiments using virtual cards, such virtual cards may be displayed on a display screen (not shown) at each of the individual player positions 172a-172g. Common virtual cards may be displayed in a common card area (not shown). The table controller 114 may further include an interface 180, which may include touch screen controls for assisting the dealer in administering the wagering game. The table 168 may further include an upright display 182 configured to display images that depict game information such as pay tables, hand counts, historical win/loss information by player, and a wide variety of other information considered useful to the players. The upright display 182 may be double sided to provide such information to players as well as to a casino pit. It is to be appreciated that the bet sensors 100a-100g may have a modular configuration to provide ease of integration with the gaming table 168.

Figure 19:
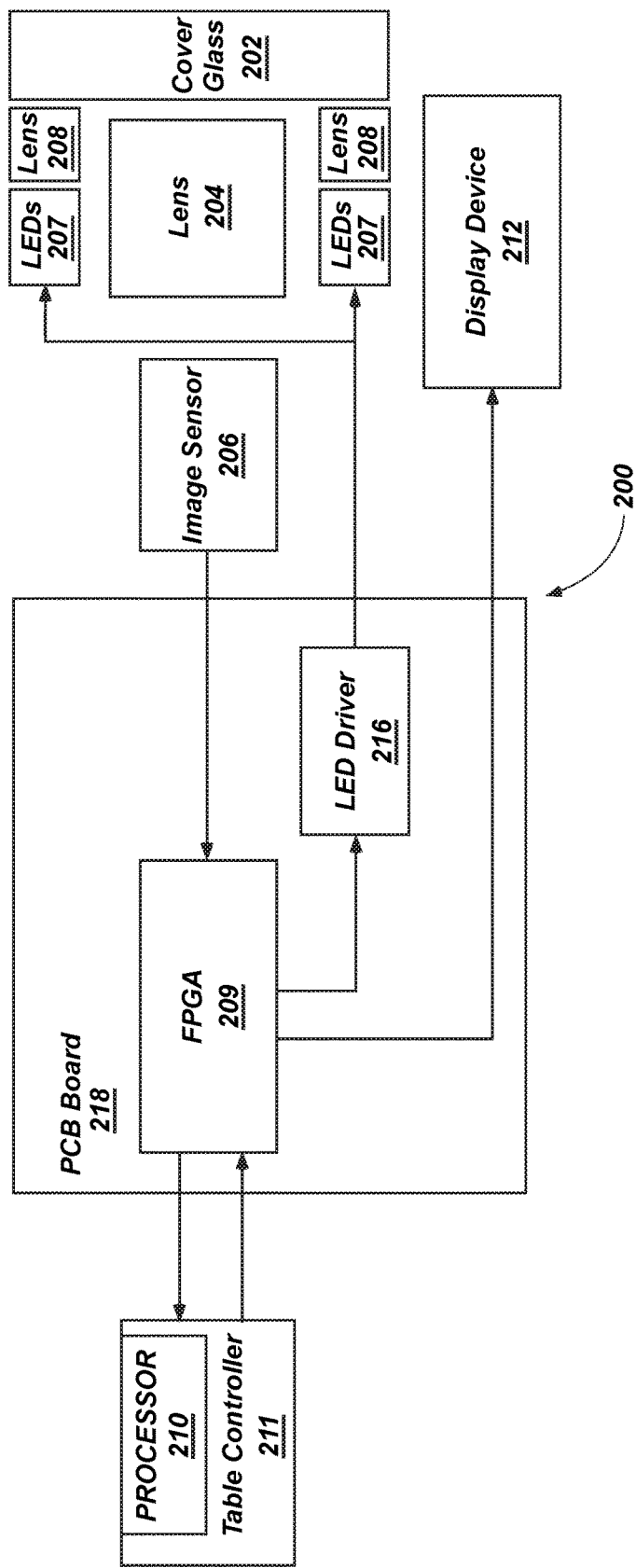
FIG. 19 is a simplified schematic diagram illustrating another embodiment of a bet sensor of the present disclosure.

In other embodiments, at least a majority of the image processing and computations may be performed by the table controller instead of by each individual bet sensor. Referring now to FIG. 19, a simplified schematic diagram of another embodiment of a bet sensor 200 is illustrated. The bet sensor 200 may be generally configured as described previously in reference to FIG. 1, and may include a transparent cover 202 in visual register with a lens 204. The transparent cover 202 may be embedded in a gaming table and may be configured to receive a stack of gaming tokens thereon. An image sensor 206 may be positioned to view the stack of gaming tokens through the transparent cover 202 and the lens 204. Proximate the transparent cover 202 may be located one or more light-emitting diodes (LEDs) 207 configured for illuminating the stack of gaming tokens to provide a satisfactory image of the stack viewable by the image sensor 206. Each of the LEDs 207 may be configured with a lens 208 to provide desired light emission qualities. The image sensor 206 may be in electronic communication with a field programmable gate array (FPGA) 209 configured to capture images from the image sensor 206 and transmit the images to a processor 210 located in a table controller 211. In alternative embodiments, any image processor may be utilized in place of the FPGA 209.

As previously described, the table controller 211 may be a personal computer (PC) based computing platform, and, in the embodiment illustrated in FIG. 19, the processor 210 may be located on the table controller 211. The processor 210 may be configured to receive a stream of captured images of the stack of gaming tokens from the FPGA 209 and to process the images (i.e., perform one or more algorithms using the images) to calculate the values of the stack of chips depicted therein. The processing algorithms performed by the processor 210 to determine the wager values may be performed as previously described herein. After the processor 210 has determined a wager value of a stack of gaming tokens, the processor 210 may display the wager value on a screen of a user interface of the table controller 211. The user interface may be configured to allow a table operator to accept, reject, or correct the wager value. The table controller 211 may comprise an override function allowing the table operator to input a corrected wager value. The processor 210 may be configured to transmit a display signal comprising the wager value to the FGPA 209. After receiving the display signal from the processor 210, the FGPA 209 may transmit the display signal to a display device 212. The display device 212 may be configured to display the wager value to the player who placed the wager, to other players, to a table operator, or to any combination thereof. The display device 212 may be configured as previously described herein.

An LED driver 216 may be electronically interposed between the FGPA 209 and the LEDs 207. As previously described herein, the processor 210 may be configured to control the lighting effects of the LEDs 207 for illuminating the stack of gaming tokens and for communicating information to players. To control the LEDs 207, the processor 210 may transmit lighting command signals to the FPGA 209, which may transmit the lighting command signals to the LED driver 216. The LED driver 216 may be configured as previously described herein, and may process the lighting command signals as previously described. The FPGA 209 and at least the LED driver 216 may be located on a printed circuit board (PCB) 218, and electronic communication between the FPGA 209 and the LED driver 216 may be provided through conductive traces, vias and interconnects in the PCB 218, as is known in the art.

Additionally, the table controller 211 may be configured to enable the table operator to communicate various signals to a player of the game through the indicator light system described above. As previously described, the computer program and/or table operator may select a lighting command signal output from a list of lighting commands stored in the table controller 114. Furthermore, the table controller 211 may be integrated with a plurality of bet sensors 200 embedded in a gaming table, wherein the table controller 211, including the processor 210, may be configured to operate each bet sensor 200 of the plurality of bet sensors 200. In some embodiments, the table controller 211 may be integrated with up to seven (7) bet sensors 200 embedded in a gaming table. It is to be appreciated that any number of bet sensors 200, including more than seven (7), may be integrated with the table controller 211.

Figure 20:
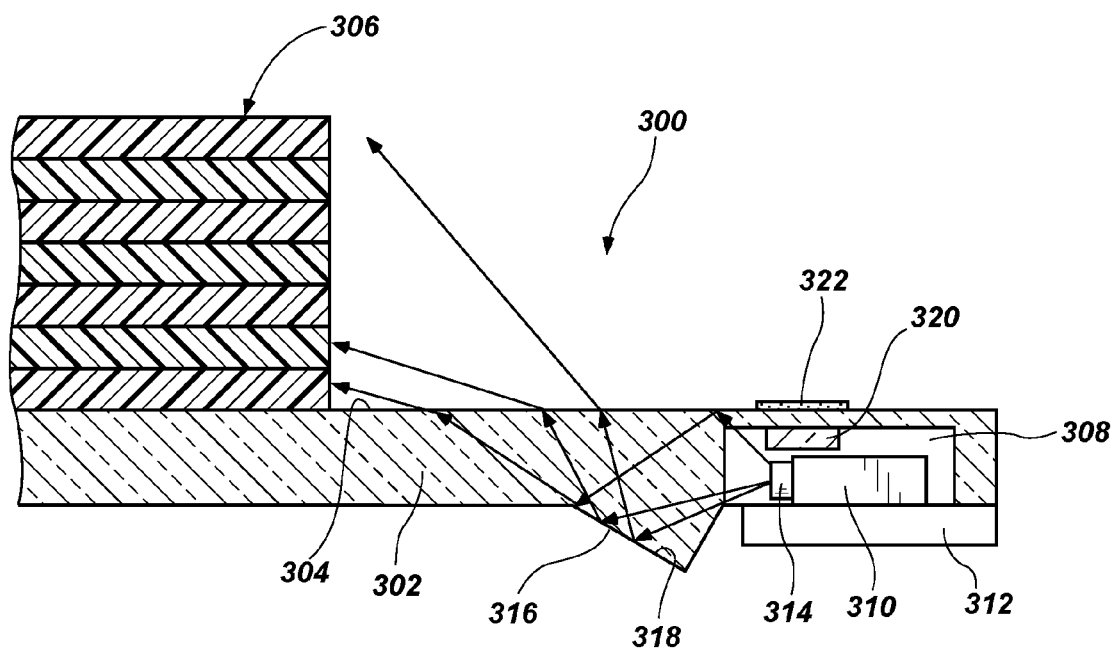
FIG. 20 is a side, partial cross-sectional view of components that may be employed in additional embodiments of bet sensors as described herein.

Referring now to FIG. 20, an embodiment of an another suitable location for the LEDs is illustrated. An illumination unit 300 may be generally configured as described above with reference to FIGS. 2 through 6, including a transparent cover 302 having a bet placement surface 304 for supporting a stack of gaming tokens 306 thereon. The cover glass may define an annular recess 308 on an underside of the transparent cover 302. One or more LEDs 310 may be positioned on a PCB 312, wherein at least part of the LED 310 is located within the annular recess 308. The LEDs 310 may be of any of the types previously described, and each may be configured to emit light through an LED lens 314 and toward the stack of gaming tokens 306. The transparent cover 302 may be configured to internally reflect a majority of the light rays emitted by the LEDs 310. A bottom surface of the transparent cover 302 may define a frustoconical portion 316 adjacent a conformal reflective surface 318 configured to eject internally reflected light rays out of the transparent cover 302 and onto the stack of gaming tokens 306.

Additionally, the transparent cover 302 and LEDs 310 may be configured to provide indicator light signals to a player of the game, as previously described. A light guide element 320 may be located in the annular recess 308 above the one or more LEDs 310 and on an underside of the transparent cover 302. The light guide element 320 may have a continuous annular configuration. The light guide element 320 may be configured to collect light emitted from the LEDs 310 and transmit the collected light in an even dispersion through a portion of the transparent cover 302 corresponding to the light guide element 320. Additionally, a portion of the top surface of the transparent cover 302 positioned above the light guide element 320 may comprise a surface element 322 configured to increase visibility of the light transmitted through the light guide element 320 and the transparent cover 302. The surface element 322 may comprise a textured, or "frosted," diffuser portion of the top surface of the cover glass. The textured diffuser portion may be configured to transmit an evenly-dispersed ring of light to a player. As previously described, the LEDs 310 may be controlled by the processor 110 to emit light in cooperation with the light guide element 320, the transparent cover 302, and the surface element 322 to provide multicolored lighting effect signals for communicating information to a player.

The embodiments of the disclosure described above do not limit the scope of the disclosure, which is defined by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those of ordinary skill in the art from the description. Such modifications and embodiments also fall within the scope of the appended claims.

What is claimed is:

1. A bet sensor, comprising:
   a bet placement surface configured and oriented to support a stack of gaming tokens;
   an image sensor located and oriented to capture at least one image of a lateral side surface of at least one gaming token of the stack of gaming tokens located on the bet placement surface, wherein the image sensor is configured to capture the at least one image depicting the lateral side surface of the at least one gaming token in a radial format about a majority of a circumference of the at least one gaming token; and
   a processor in communication with the image sensor, the processor configured to acquire image data from the at least one image and analyze the image data to determine a wager value of the at least one gaming token.

2. The bet sensor of claim 1, wherein the processor is further configured to determine the wager value of the at least one gaming token where the wager value is the same as a wager value of at least another gaming token of the stack of gaming tokens.

3. The bet sensor of claim 1, wherein the processor is further configured to determine the wager value of the at least one gaming token where the wager value of the at least one gaming token is the same as a wager value of each gaming token of the stack of gaming tokens.

4. The bet sensor of claim 1, wherein the processor is further configured to:
   acquire image data from the at least one image and analyze the image data to determine wager values from each gaming token of the stack of gaming tokens; and
   sum the wager values to determine a total wager value of the stack of gaming tokens.

5. The bet sensor of claim 4, wherein the processor is further configured to determine the wager values from each gaming token of the stack of gaming tokens where the wager values comprise a common wager value.

6. The bet sensor of claim 4, wherein the processor is further configured to determine the wager values from each gaming token of the stack of gaming tokens where the wager values comprise differing wager values.

7. The bet sensor of claim 1, wherein the processor is further configured to individually determine a wager value of each gaming token of the stack of gaming tokens utilizing the at least one image.

8. The bet sensor of claim 1, wherein the processor is further configured to display the wager value of the at least one gaming token to a user.

9. The bet sensor of claim 1, wherein the processor is further configured to determine the wager value of the at least one gaming token based one at least one indicia on the lateral side surface of the at least one gaming token.

10. The bet sensor of claim 9, further comprising memory associated with the processor, the memory containing stored values of indicia of a plurality of gaming tokens, wherein the processor is configured to compare the at least one indicia on the lateral side surface of the at least one gaming token with the stored values of indicia of the plurality of gaming tokens.

11. A bet sensor, comprising:
    an image sensor configured to capture at least one image of a lateral side surface of at least one gaming token of a stack of gaming tokens from a position below the stack of gaming tokens, wherein the image sensor is configured to depict the lateral side surface of the at least one gaming token about a majority of a circumference of the at least one gaming token; and
    a processor in communication with the image sensor, the processor configured to acquire image data from the at least one image and analyze the image data to determine a wager value of the at least one gaming token.

12. The bet sensor of claim 11, further comprising memory associated with the processor, the memory containing a plurality of template match candidates, the memory containing color content histograms of substantially each of the plurality of template match candidates, each of the plurality of template match candidates comprising a depiction of at least a portion of a lateral side surface of an associated template gaming token, each associated template gaming token having an associated wager value stored in the memory.

13. The bet sensor of claim 11, further comprising a surface configured and oriented to support the stack of gaming tokens.

14. The bet sensor of claim 11, wherein the processor is further configured to determine a wager value of another gaming token of the stack of gaming tokens where the wager value of the another gaming token is the same as the wager value of the at least one gaming token.

15. The bet sensor of claim 11, wherein the processor is further configured to determine a wager value of each gaming token of the stack of gaming tokens where the wager value of each gaming token is the same as the wager value of the at least one gaming token.

16. A gaming device, comprising:
    a gaming device having a surface for performing at least one gaming-related act; and
    at least one bet sensor located proximate the surface of the gaming device, the at least one bet sensor comprising the bet sensor of claim 1.

17. A method of operating a bet sensor, the method comprising:

capturing, with an image sensor, an image of a lateral side surface of at least one gaming token, wherein the lateral side surface is depicted in a radial format showing the lateral side surface of the at least one gaming token about a majority of an outermost lateral boundary of the at least one gaming token;

analyzing image data of the image with at least one processor; and determining a wager value of the at least one gaming token with the at least one processor.

18. The method of claim 17, wherein determining a wager value of the at least one gaming token with the at least one processor comprises determining a wager value of the at least one gaming token in a stack of gaming tokens with the at least one processor where a wagering value of at least one gaming token of the stack of gaming tokens is the same as the wager value of the at least one gaming token.

19. The method of claim 17, further comprising determining a wager value of the at least another gaming token with the at least one processor, wherein the wager value of at least another gaming token is the same as the wager value of the at least one gaming token.

20. The method of claim 17, further comprising determining a wager value of each gaming token of a stack of gaming tokens with the at least one processor, wherein the wager value of each gaming token of the stack of gaming tokens is the same as the wager value of the at least one gaming token.

* * * * *

UNITED STATES PATENT AND TRADEMARK OFFICE
CERTIFICATE OF CORRECTION

PATENT NO. : 9,940,776 B2  
APPLICATION NO. : 15/332652  
DATED : April 10, 2018  
INVENTOR(S) : Zbigniew Czyzewski et al.

Page 1 of 1

It is certified that error appears in the above-identified patent and that said Letters Patent is hereby corrected as shown below:

In the Specification

Column 24, Line 60, change "radially inwward from" to --radially inward from--

Signed and Sealed this  
Fifteenth Day of May, 2018

Andrei Iancu  
*Director of the United States Patent and Trademark Office*